United States Patent
Zhang et al.

(10) Patent No.: US 12,530,101 B2
(45) Date of Patent: Jan. 20, 2026

(54) TOUCH SUBSTRATE, DISPLAY PANEL, AND ELECTRONIC DEVICE

(71) Applicants: Chengdu BOE Optoelectronics Technology Co., Ltd., Sichuan (CN); BOE Technology Group Co., Ltd., Beijing (CN)

(72) Inventors: Shun Zhang, Beijing (CN); Yang Zeng, Beijing (CN); Chang Luo, Beijing (CN); Yuanqi Zhang, Beijing (CN); Tianci Chen, Beijing (CN)

(73) Assignees: Chengdu BOE Optoelectronics Technology Co., Ltd., Chengdu (CN); BOE Technology Group Co., Ltd., Beijing (CN)

( * ) Notice: Subject to any disclaimer, the term of this patent is extended or adjusted under 35 U.S.C. 154(b) by 190 days.

(21) Appl. No.: 18/274,177

(22) PCT Filed: Mar. 4, 2022

(86) PCT No.: PCT/CN2022/079291
§ 371 (c)(1),
(2) Date: Jul. 25, 2023

(87) PCT Pub. No.: WO2022/222615
PCT Pub. Date: Oct. 27, 2022

(65) Prior Publication Data
US 2024/0094855 A1    Mar. 21, 2024

(30) Foreign Application Priority Data

Apr. 20, 2021  (WO) ............... PCT/CN2021/088322
Dec. 22, 2021  (CN) .......................... 202111582513.4

(51) Int. Cl.
G06F 3/044    (2006.01)
G06F 3/041    (2006.01)
H10K 59/80    (2023.01)

(52) U.S. Cl.
CPC .......... *G06F 3/0448* (2019.05); *G06F 3/0412* (2013.01); *G06F 3/0445* (2019.05);
(Continued)

(58) Field of Classification Search
CPC .... G06F 3/0448; G06F 3/0412; G06F 3/0445; G06F 3/0446; G06F 2203/04103;
(Continued)

(56) References Cited

U.S. PATENT DOCUMENTS

2011/0102361 A1   5/2011   Philipp
2013/0299222 A1   11/2013  Lee et al.
(Continued)

FOREIGN PATENT DOCUMENTS

CN    102053751 A    5/2011
CN    102830841 A    12/2012
(Continued)

*Primary Examiner* — Abhishek Sarma
(74) *Attorney, Agent, or Firm* — Banner & Witcoff, Ltd.

(57) ABSTRACT

A touch substrate, a display panel, and an electronic device are provided. The touch substrate includes a base substrate, and first touch electrodes and second touch electrodes on the base substrate; the first touch electrodes are arranged in a first direction, with each first touch electrode extending in a second direction; the second touch electrodes are arranged in the second direction, with each second touch electrode extending in the first direction, the first touch electrode and the second touch electrode are spaced apart and insulated from each other; in a direction perpendicular to the base substrate, the first touch electrodes overlap with the second touch electrodes to form overlapping regions; and in the overlapping region, any first edge extending in the first
(Continued)

direction in the conductive grid of the firm touch electrode does not overlap with the first edge in the conductive grid of the second touch electrode.

18 Claims, 10 Drawing Sheets

(52) U.S. Cl.
CPC .. *G06F 3/0446* (2019.05); *G06F 2203/04103* (2013.01); *G06F 2203/04112* (2013.01); *H10K 59/8731* (2023.02)

(58) Field of Classification Search
CPC ........... G06F 2203/04112; G06F 3/041; G06F 3/044; G06F 3/0443; G06F 3/0418; H10K 59/8731

See application file for complete search history.

(56) References Cited

U.S. PATENT DOCUMENTS

| | | |
|---|---|---|
| 2016/0103520 A1 | 4/2016 | Kim et al. |
| 2016/0110008 A1 | 4/2016 | Lee et al. |
| 2017/0221195 A1 | 8/2017 | Iwami |
| 2018/0192503 A1 | 7/2018 | Fang et al. |
| 2019/0047605 A1 | 2/2019 | Clochard et al. |
| 2020/0064972 A1 | 2/2020 | Yen et al. |
| 2020/0301545 A1 | 9/2020 | Yang et al. |
| 2021/0004123 A1 | 1/2021 | Tan et al. |
| 2021/0097919 A1 | 4/2021 | Chai et al. |
| 2021/0357077 A1 | 11/2021 | Feng |

FOREIGN PATENT DOCUMENTS

| | | |
|---|---|---|
| CN | 103389843 A | 11/2013 |
| CN | 203376735 U | 1/2014 |
| CN | 105528125 A | 4/2016 |
| CN | 106020547 A | 10/2016 |
| CN | 106796471 A | 5/2017 |
| CN | 106953628 A | 7/2017 |
| CN | 107310250 A | 11/2017 |
| CN | 108698626 A | 10/2018 |
| CN | 108885516 A | 11/2018 |
| CN | 208367661 U | 1/2019 |
| CN | 109375826 A | 2/2019 |
| CN | 110308822 A | 10/2019 |
| CN | 110858087 A | 3/2020 |
| JP | 2014175609 A | 9/2014 |
| JP | 2014203664 A | 10/2014 |
| JP | 2015072517 A | 4/2015 |
| JP | 2016115152 A | 6/2016 |
| KR | 20170077583 A | 7/2017 |

TOUCH SUBSTRATE, DISPLAY PANEL, AND ELECTRONIC DEVICE

This application is a national stage application of International Patent Application No. PCT/CN2022/079291, filed Mar. 4, 2022, which claims the priority to and benefits of International Patent Application No. PCT/CN2021/088322, filed on Apr. 20, 2021, and Chinese Patent Application No. 202111582513.4, filed on Dec. 22, 2021, and the entire content disclosed by the PCT international application and the Chinese Patent Application is incorporated herein by reference as part of the present application.

TECHNICAL FIELD

Embodiments of the present disclosure relate to a touch substrate, a display panel, and an electronic device.

BACKGROUND

User interfaces with a touch function have been widely used in various electronic devices, such as display panels, display devices, or the like. The touch control structure for implementing the touch function includes a touch electrode structure. The setting of the touch electrode structure is an important factor influencing the user experience.

SUMMARY

At least an embodiment of the present disclosure provides a touch substrate, and the touch substrate comprises a base substrate, and a plurality of first touch electrodes and a plurality of second touch electrodes on the base substrate; the plurality of first touch electrodes are arranged in a first direction, with each of the first touch electrodes extending in a second direction different from the first direction, and the plurality of second touch electrodes are arranged in the second direction, with each of the second touch electrodes extending in the first direction; each first touch electrode of the first touch electrodes and each second touch electrode of the second touch electrodes are spaced apart and insulated from each other; in a direction perpendicular to the base substrate, each first touch electrode overlaps with the plurality of second touch electrodes, respectively, and each second touch electrode overlaps with the plurality of first touch electrodes, respectively, so as to allow a plurality of overlapping regions and a plurality of non-overlapping regions to be formed between the plurality of first touch electrodes and the plurality of second touch electrodes; the first touch electrode and the second touch electrode respectively comprise a grid structure formed by a plurality of conductive grids; each conductive grid comprises a first edge extending in the first direction; and in the overlapping region, the conductive grid of the second touch electrode comprises at least one first edge, and any first edge in the conductive grid of the first touch electrode does not overlap with the at least one first edge in the conductive grid of the second touch electrode in the direction perpendicular to the base substrate.

For example, in the touch substrate provided by an embodiment of the present disclosure, in the overlapping region, the conductive grid of the first touch electrode comprises at least one first edge, and the at least one first edge in the conductive grid of the first touch electrode is spaced apart from the at least one first edge in the conductive grid of the second touch electrode in the second direction.

For example, in the touch substrate provided by an embodiment of the present disclosure, in the overlapping region, each first edge in the conductive grid of the first touch electrode is between two adjacent first edges, in the second direction, in the conductive grid of the second touch electrode in the second direction.

For example, in the touch substrate provided by an embodiment of the present disclosure, each conductive grid further comprises a second edge extending in the second direction, and the first edge and the second edge are alternately connected to form the conductive grid.

For example, in the touch substrate provided by an embodiment of the present disclosure, in the overlapping region, the conductive grid of the first touch electrode comprises at least one second edge, and any second edge in the conductive grid of the second touch electrode does not overlap with the at least one second edge in the conductive grid of the first touch electrode in the direction perpendicular to the base substrate.

For example, in the touch substrate provided by an embodiment of the present disclosure, the conductive grid of the second touch electrode comprises at least one second edge, and the at least one second edge in the conductive grid of the second touch electrode is spaced apart from the at least one second edge in the conductive grid of the first touch electrode in the first direction.

For example, in the touch substrate provided by an embodiment of the present disclosure, the first direction is perpendicular to the second direction, and the conductive grid is a square conductive grid.

For example, in the touch substrate provided by an embodiment of the present disclosure, the first touch electrode comprises a plurality of first touch sub-electrodes and at least one first connection electrode, the plurality of first touch sub-electrodes are arranged in the second direction, and the first connection electrode is between two adjacent first touch sub-electrodes in the second direction to allow the two adjacent first touch sub-electrodes to be electrically connected; the second touch electrode comprises a plurality of second touch sub-electrodes and at least one second connection electrode, the plurality of second touch sub-electrodes are arranged in the first direction, and the second connection electrode is between two adjacent second touch sub-electrodes in the first direction to allow the two adjacent second touch sub-electrodes to be electrically connected; the first connection electrode and the second connection electrode are respectively in different conductive layers with respect to the base substrate; and the first connection electrode and the second connection electrode are at least partially in the overlapping region and partially overlap with each other in the direction perpendicular to the base substrate.

For example, in the touch substrate provided by an embodiment of the present disclosure, the first connection electrode comprises at least one first connection sub-electrode extending in the second direction, and the second connection electrode comprises at least one second connection sub-electrode extending in the first direction; and in the overlapping region, adjacent conductive grids in the second direction in the first touch electrode are connected in sequence in the second direction to form the first connection sub-electrode, and adjacent conductive grids in the first direction in the second touch electrode are connected in sequence in the first direction to form the second connection sub-electrode.

For example, in the touch substrate provided by an embodiment of the present disclosure, in response to the first connection electrode comprising a plurality of first connection sub-electrodes, the plurality of first connection sub-electrodes are sequentially arranged in the first direction, and extending directions of the plurality of first connection sub-electrodes are substantially parallel to each other; and in response to the second connection electrode comprising a plurality of second connection sub-electrodes, the plurality of second connection sub-electrodes are sequentially arranged in the second direction, and extending directions of the plurality of second connection sub-electrodes are substantially parallel to each other.

For example, in the touch substrate provided by an embodiment of the present disclosure, in the overlapping region, centers of adjacent conductive grids in the second direction in the first connection sub-electrode are approximately in an identical straight line extending in the second direction.

For example, in the touch substrate provided by an embodiment of the present disclosure, the touch substrate comprises a first conductive layer, an insulating layer, and a second conductive layer which are provided on the base substrate, the insulating layer is between the first conductive layer and the second conductive layer, and the first conductive layer and the second conductive layer are spaced apart and insulated from each other by the insulating layer in the direction perpendicular to the base substrate; the first touch sub-electrode is in the second conductive layer, the first connection electrode is in the first conductive layer, the first touch sub-electrode is connected to the first connection electrode through a via hole structure penetrating through at least the insulating layer; and the second touch sub-electrode and the second connection electrode are in the second conductive layer.

For example, in the touch substrate provided by an embodiment of the present disclosure, the via hole structure is connected to a corresponding first connection sub-electrode through a plurality of conductive grids in the corresponding first connection sub-electrode.

For example, in the touch substrate provided by an embodiment of the present disclosure, an area of a region surrounded by the conductive grid of the first touch electrode in the overlapping region is greater than or equal to an area of a region surrounded by the conductive grid of the first touch electrode in the non-overlapping region, and/or an area of a region surrounded by the conductive grid of the second touch electrode in the overlapping region is greater than or equal to an area of a region surrounded by the conductive grid of the second touch electrode in the non-overlapping region.

For example, in the touch substrate provided by an embodiment of the present disclosure, an arrangement density of conductive grids in the first touch electrode in the overlapping region is smaller than or equal to an arrangement density of conductive grids in the first touch electrode in the non-overlapping region, and/or an arrangement density of conductive grids in the second touch electrode in the overlapping region is smaller than or equal to an arrangement density of conductive grids in the second touch electrode in the non-overlapping region.

For example, in the touch substrate provided by an embodiment of the present disclosure, the conductive grid is a metal grid.

For example, in the touch substrate provided by an embodiment of the present disclosure, the conductive grid comprises a closed grid and further comprises a non-closed grid with at least one notch being provided on at least one edge of the conductive grid; and in the first touch electrode, a number of notches in the conductive grid in the non-overlapping region is greater than or equal to a number of notches in the conductive grid in the overlapping region, and/or in the second touch electrode, a number of notches in the conductive grid in the non-overlapping region is greater than or equal to a number of notches in the conductive grid in the overlapping region.

For example, in the touch substrate provided by an embodiment of the present disclosure, the conductive grid of the first touch electrode in the overlapping region is a closed grid, and the conductive grid of the second touch electrode in the overlapping region is a closed grid.

For example, in the touch substrate provided by an embodiment of the present disclosure, the touch substrate is configured to be stacked with a display device, the display device comprises a plurality of pixel units arranged in an array, and each pixel unit of the plurality of pixel units comprises a plurality of sub-pixels; and one conductive grid corresponds to at least one sub-pixel, and an orthographic projection of the at least one sub-pixel on the base substrate is within a region surrounded by an orthographic projection of the corresponding one conductive grid on the base substrate.

For example, in the touch substrate provided by an embodiment of the present disclosure, at least one edge of the conductive grid extends in a folding-line shape.

For example, in the touch substrate provided by an embodiment of the present disclosure, the plurality of sub-pixels comprise a first sub-pixel and a second sub-pixel arranged in the second direction, the first sub-pixel and the second sub-pixel respectively correspond to one conductive grid, and a bending direction of the second edge of the conductive grid corresponding to the first sub-pixel and a bending direction of the second edge of the conductive grid corresponding to the second sub-pixel are opposite to each other in the first direction.

For example, in the touch substrate provided by an embodiment of the present disclosure, the plurality of sub-pixels comprise a first sub-pixel and a third sub-pixel arranged in the first direction, the first sub-pixel and the third sub-pixel respectively correspond to one conductive grid, and a bending direction of the first edge of the conductive grid corresponding to the first sub-pixel and a bending direction of the first edge of the conductive grid corresponding to the third sub-pixel are opposite to each other in the second direction.

For example, in the touch substrate provided by an embodiment of the present disclosure, a distance between each sub-pixel and an edge or vertex of a corresponding conductive grid is within a preset range of 8 μm to 15 μm.

For example, in the touch substrate provided by an embodiment of the present disclosure, the plurality of sub-pixels are respectively configured to provide light of different colors.

For example, in the touch substrate provided by an embodiment of the present disclosure, the first touch electrode is a touch control driving electrode, and the second touch electrode is a touch control sensing electrode, or the first touch electrode is a touch control sensing electrode, and the second touch electrode is a touch control driving electrode.

At least an embodiment of the present disclosure further provides a display panel, the display panel comprises the touch substrate according to any one of the embodiments of the present disclosure and a display device, and the display device is stacked with the touch substrate.

At least an embodiment of the present disclosure further provides an electronic device, and the electronic device comprises the display panel according to any one of the embodiments of the present disclosure.

BRIEF DESCRIPTION OF THE DRAWINGS

In order to clearly illustrate the technical solutions of the embodiments of the present disclosure, the drawings of the embodiments will be briefly described in the following. It is obvious that the described drawings are only related to some embodiments of the present disclosure and thus are not limitative to the present disclosure.

DETAILED DESCRIPTION

Figure 1:
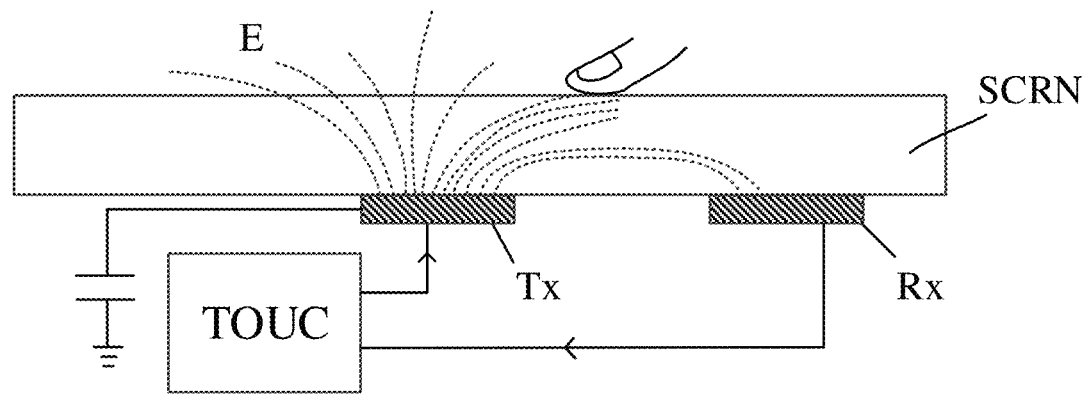
FIG. 1 is a schematic diagram illustrating an operating principle of a mutual capacitance touch control structure.

In order to make objects, technical solutions, and advantages of the embodiments of the present disclosure apparent, the technical solutions of the embodiments of the present disclosure will be described in a clearly and fully understandable way in connection with the drawings related to the embodiments of the present disclosure. Apparently, the described embodiments are just a part but not all of the embodiments of the present disclosure. Based on the described embodiments of the present disclosure herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect," "connected," "coupled," etc., are not limited to a physical connection or mechanical connection, but may include an electrical connection, directly or indirectly. "On," "under," "right," "left," and the like are only used to indicate relative position relationship, and when the position of the object which is described is changed, the relative position relationship may be changed accordingly.

The drawings in the present disclosure are not drawn strictly to the actual scale. Numbers of first touch electrodes, second touch electrodes, first touch sub-electrodes, second touch sub-electrodes, first connection electrodes, second connection electrodes, connection sub-electrodes, conductive grids and the like in the touch substrate are not limited to numbers illustrated in the drawings. The specific dimensions and numbers of respective structures may be determined according to actual requirements. The drawings described in the present disclosure are merely schematic structural diagrams.

Organic light-emitting diode (OLED) display panels have characteristics of self-illumination, high contrast, low energy consumption, wide viewing angle, fast response, being applicable for flexible panels, wide temperature range, simple manufacturing or the like, and thus have broad development prospects. To meet diversified usage requirements of users, a plurality of functions are integrated into the display panel, such as a touch control function, a fingerprint recognition function, or the like, which may be of great significance. For example, forming an on-cell touch control structure in the OLED display panel is an implementation, which enables the touch control function of the OLED display panel to be achieved by forming the touch control structure on an encapsulation film of the OLED display panel.

For example, taking a mutual capacitance touch control structure as an example, the mutual capacitance touch control structure includes a plurality of touch electrodes. The plurality of touch electrodes include a touch control driving electrode Tx and a touch control sensing electrode Rx which extend in different directions, and the mutual capacitance for touch sensing is formed at the crossing of the touch control driving electrode Tx and the touch control sensing electrode Rx. The touch control driving electrode Tx is configured to input an excitation signal (e.g., a touch control driving signal), and the touch control sensing electrode Rx is configured to output a touch control sensing signal. By inputting the excitation signal to the touch control driving electrode (e.g., extending longitudinally), the touch control sensing signal is received from the touch control sensing electrode (e.g., extending transversely), so that a detection signal reflecting a magnitude of a capacitance value of a coupling point (e.g., a cross point) of the transverse and longitudinal electrodes can be obtained. When a finger touches a touch screen (e.g., cover glass), the coupling between the touch control driving electrode Tx and the touch control sensing electrode Rx in the vicinity of the touch point is affected, so that the mutual capacitance formed at the cross point between the two electrodes is changed, leading to a change in the output touch control sensing signal. Corresponding coordinates of the touch point can be calculated based on a data variation of the touch control sensing signal.

FIG. 1 is a schematic diagram illustrating an operating principle of a mutual capacitance touch control structure. As illustrated in FIG. 1, driven by a touch control driving circuit TOUC, the touch control driving electrode Tx is applied with a touch control driving signal and thereby generates an electric field line E which is received by the touch control sensing electrode Rx to form a reference capacitance. When a finger touches a touch screen SCRN, since the human body is a conductor, part of the electric field line E generated by the touch control driving electrode Tx is guided to the finger to form a finger capacitance, so that the electric field line E received by the touch control sensing electrode Rx is reduced. Therefore, a capacitance value between the touch control driving electrode Tx and the touch control sensing electrode Rx is reduced. The touch control driving circuit TOUC obtains the magnitude of the above-mentioned capacitance value by means of the touch control sensing electrode Rx, and compares the obtained capacitance value with the reference capacitance to obtain a capacitance value variation. Corresponding coordinates of the touch point can be calculated based on the data of the capacitance value variation in combination with position coordinates of each touch control capacitance.

At least one embodiment of the present disclosure provides a touch substrate, and the touch substrate includes a base substrate, and a plurality of first touch electrodes and a plurality of second touch electrodes on the base substrate; the plurality of first touch electrodes are arranged in a first direction, with each of the first touch electrodes extending in a second direction different from the first direction, and the plurality of second touch electrodes are arranged in the second direction, with each of the second touch electrodes extending in the first direction; each first touch electrode of the first touch electrodes and each second touch electrode of the second touch electrodes are spaced apart and insulated from each other; in a direction perpendicular to the base substrate, each first touch electrode overlaps with the plurality of second touch electrodes, respectively, and each second touch electrode overlaps with the plurality of first touch electrodes, respectively, so as to allow a plurality of overlapping regions and a plurality of non-overlapping regions to be formed between the plurality of first touch electrodes and the plurality of second touch electrodes; the first touch electrode and the second touch electrode respectively include a grid structure formed by a plurality of conductive grids; each conductive grid includes a first edge extending in the first direction; and in the overlapping region, the conductive grid of the second touch electrode includes at least one first edge, and any first edge in the conductive grid of the first touch electrode does not overlap with the at least one first edge in the conductive grid of the second touch electrode in the direction perpendicular to the base substrate.

In the touch substrate provided by the above embodiment of the present disclosure, in the overlapping region, any first edge in the conductive grid of the first touch electrode does not overlap with the first edge in the conductive grid of the second touch electrode, that is, the conductive grid of the first touch electrode in the overlapping region does not include the first edge, or in the case that the conductive grid of the first touch electrode in the overlapping region includes the first edge, the first edge in the conductive grid of the first touch electrode does not overlap with the first edge in the conductive grid of the second touch electrode. Thus, an overlapping area of the first touch electrode and the second touch electrode in the overlapping region can be reduced, thereby being conducive to reducing the capacitance that can be formed between the first touch electrode and the second touch electrode in the overlapping region and shortening the charging time needed. Thus, when a numerical value of the capacitance formed between the first touch electrode and the second touch electrode in the overlapping region changes, time taken to obtain a variation of the numerical value of the capacitance can be shortened, thereby improving the touch control sensitivity and accuracy of the touch substrate.

The embodiments of the present disclosure will be described below in detail with reference to the accompanying drawings. It should be noted that like reference numerals in different drawings will be used to refer to the same or like described elements.

Figure 2:
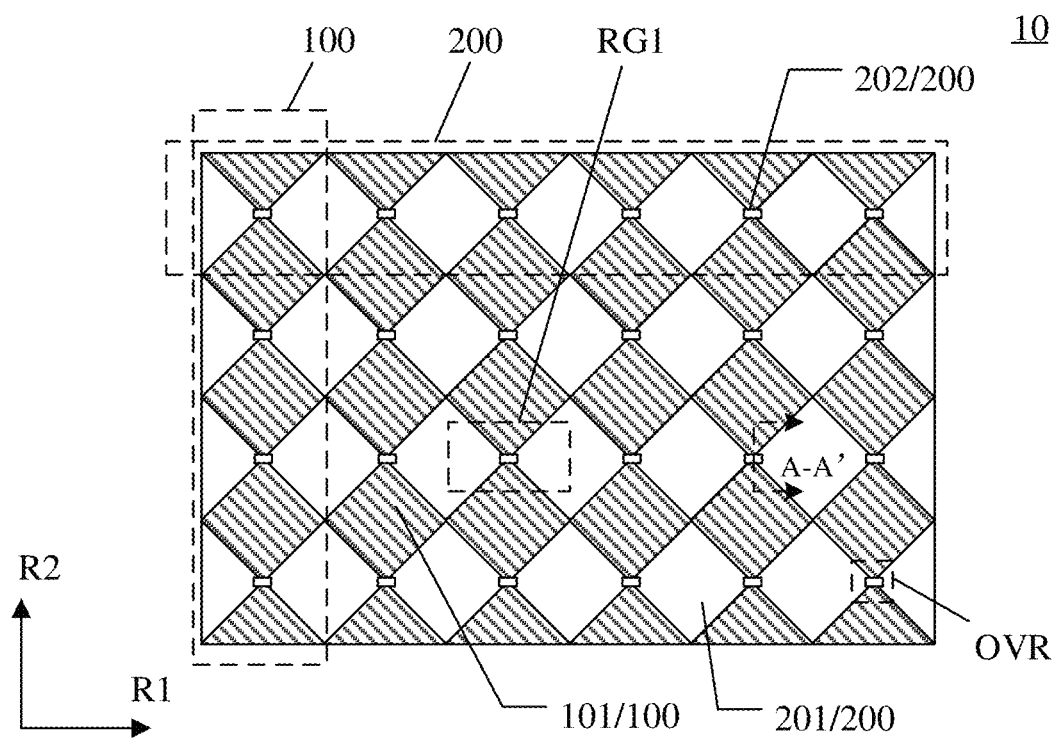
FIG. 2 is a schematic diagram of a planar structure of a touch substrate provided by some embodiments of the present disclosure.
Figure 3:
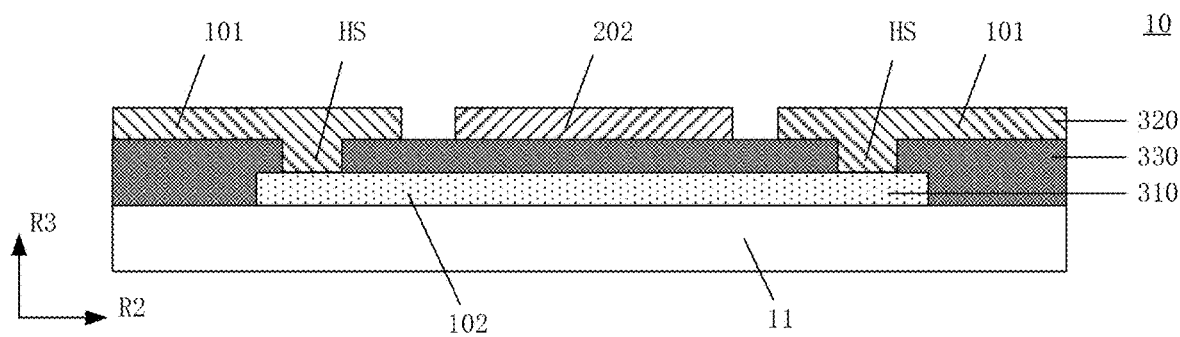
FIG. 3 is a schematic diagram of a cross-sectional structure of a touch substrate provided by some embodiments of the present disclosure.

FIG. 2 is a schematic diagram of a planar structure of a touch substrate provided by some embodiments of the present disclosure, and FIG. 3 is a schematic diagram of a cross-sectional structure of a touch substrate provided by some embodiments of the present disclosure. For example, FIG. 3 is a cross-sectional view taken along the line A-A' in FIG. 2.

As illustrated in FIG. 2 and FIG. 3, the touch substrate 10 includes a base substrate 11, and a plurality of first touch electrodes 100 and a plurality of second touch electrodes 200 located on the base substrate 11. The plurality of first touch electrodes 100 are arranged in a first direction R1, and each first touch electrode 100 extends in a second direction R2 different from the first direction R1. The plurality of second touch electrodes 200 are arranged in the second direction R2, and each second touch electrode 200 extends in the first direction R1.

For example, an included angle between the first direction R1 and the second direction R2 may be set in a range of 70° to 90°, which includes 70° and 90°. For example, the included angle between the first direction R1 and the second direction R2 may be 70°, 75°, 80°, 85°, 90°, or the like. The specific value of the included angle may be set according to the actual situation, and the embodiments of the present disclosure are not specifically limited in this aspect.

For example, in the touch substrate 10 provided by the embodiments of the present disclosure, the first direction R1 may be set to be perpendicular to the second direction R2. When the touch substrate 10 provided by the embodiments of the present disclosure is applied to such as a display panel or a display device, the first direction R1 may be a column direction of a sub-pixel array in the display panel or the display device, and the second direction R2 may be a row direction of the sub-pixel array in the display panel or the display device. Alternatively, the first direction R1 may be the row direction of the sub-pixel array in the display panel or the display device, and the second direction R2 may be the column direction of the sub-pixel array in the display panel or the display device. The embodiments of the present disclosure are not limited in this aspect.

As illustrated in FIG. 2 and FIG. 3, in a direction R3 perpendicular to the base substrate 11, each first touch electrode 100 overlaps with the plurality of second touch electrodes 200, respectively, and each second touch electrode 200 overlaps with the plurality of first touch electrodes 100, respectively, so that a plurality of overlapping regions OVR and a plurality of non-overlapping regions are formed between the plurality of first touch electrodes 100 and the plurality of second touch electrodes 200.

Each of the first touch electrodes 100 and each of the second touch electrodes 200 are spaced apart and insulated from each other. That is, each first touch electrode 100 is spaced apart and insulated from other first touch electrodes 100 and the plurality of second touch electrodes 200, and each second touch electrode 200 is spaced apart and insulated from other second touch electrodes 200 and the plurality of first touch electrodes 100.

In the following, the touch substrate provided by some embodiments of the present disclosure is described specifically by taking the case where, as illustrated in FIG. 2 and FIG. 3, the first touch electrode 100 includes a first touch sub-electrode 101 and a first connection electrode 102 and the second touch electrode 200 includes a second touch sub-electrode 201 and a second connection electrode 202 as an example. However, it should be noted that the embodiments of the present disclosure include but are not limited thereto.

In some embodiments of the present disclosure, as illustrated in FIG. 2 and FIG. 3, the first touch electrode 100 includes a plurality of first touch sub-electrodes 101 and a plurality of first connection electrodes 102. The plurality of first touch sub-electrodes 101 are arranged in the second direction R2, and the first connection electrode 102 is located between two adjacent first touch sub-electrodes 101 in the second direction R2, so as to allow the two adjacent first touch sub-electrodes 101 to be electrically connected to each other through the first connection electrode 102. The second touch electrode 200 includes a plurality of second touch sub-electrodes 201 and a plurality of second connection electrodes 202. The plurality of second touch sub-electrodes 201 are arranged in the first direction R1, and the second connection electrode 202 is located between two adjacent second touch sub-electrodes 201 in the first direction R1, so as to allow the two adjacent second touch sub-electrodes 201 to be electrically connected to each other through the second connection electrode 202.

It should be noted that the numbers of the first touch sub-electrodes 101 and the first connection electrodes 102 included in the first touch electrode 100 and the numbers of the second touch sub-electrodes 201 and the second connection electrodes 202 included in the second touch electrode 200 as illustrated in FIG. 2 are all illustrated exemplarily, and the embodiments of the present disclosure are not particularly limited in this aspect.

It should be noted that major contours of the first touch sub-electrodes 101 in the first touch electrode 100 and the second touch sub-electrodes 201 in the second touch electrode 200 as illustrated in FIG. 2 are all rhombus-shaped. However, in some other embodiments of the present disclosure, the first touch sub-electrode 101 and the second touch sub-electrode 201 may also be provided in other regular or irregular shapes, such as the triangle, rectangle, hexagon, octagon, strip, etc., and the embodiments of the present disclosure are not particularly limited in this aspect. For example, the major contours of the first touch sub-electrodes 101 and the second touch sub-electrodes 201 may be the same as or different from each other.

Figure 4A:
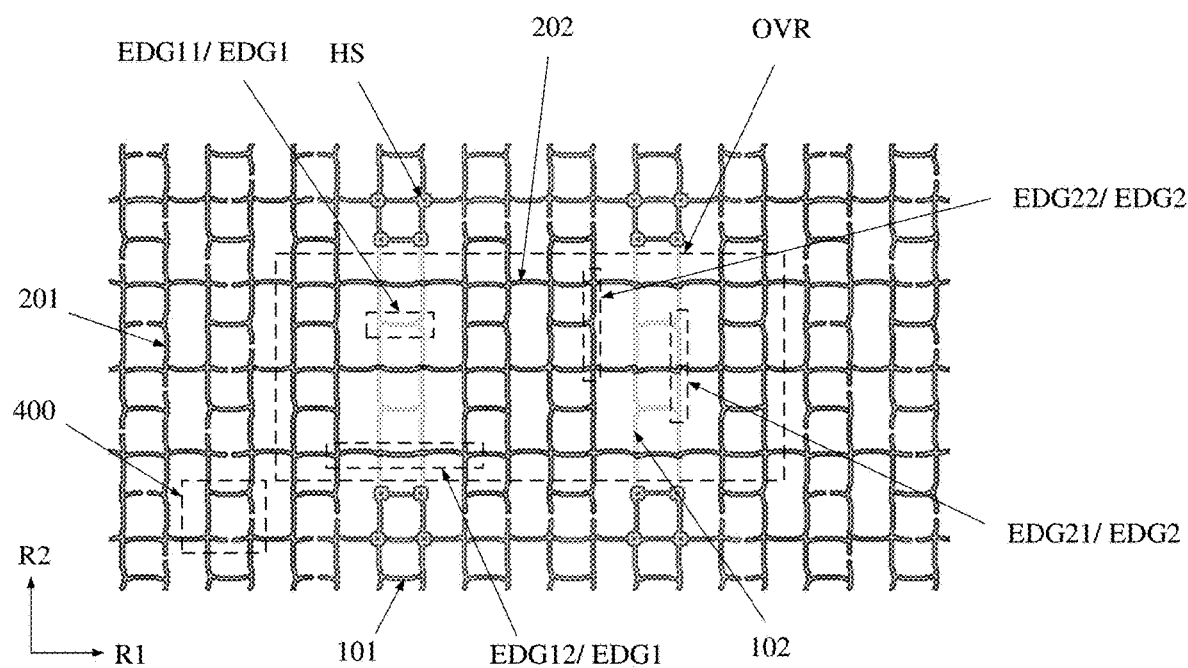
FIG. 4A and FIG. 4B are schematic partial enlarged views of an example of a region RG1 illustrated in FIG. 2.
Figure 4B:
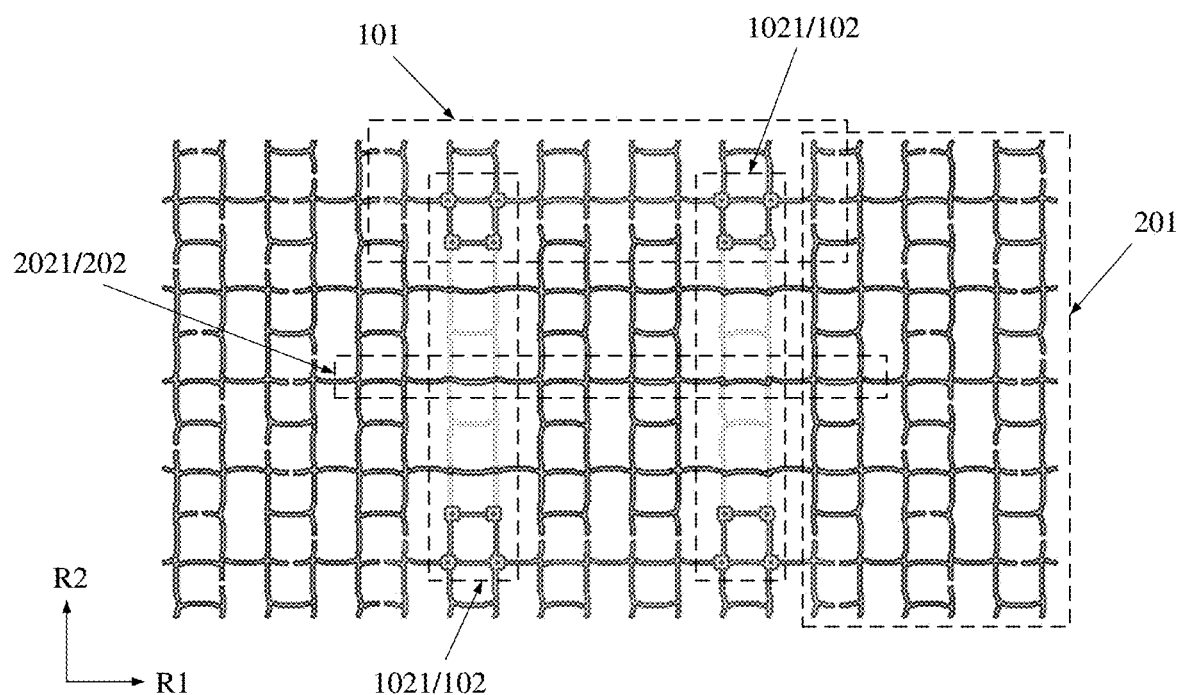
Figure 5:
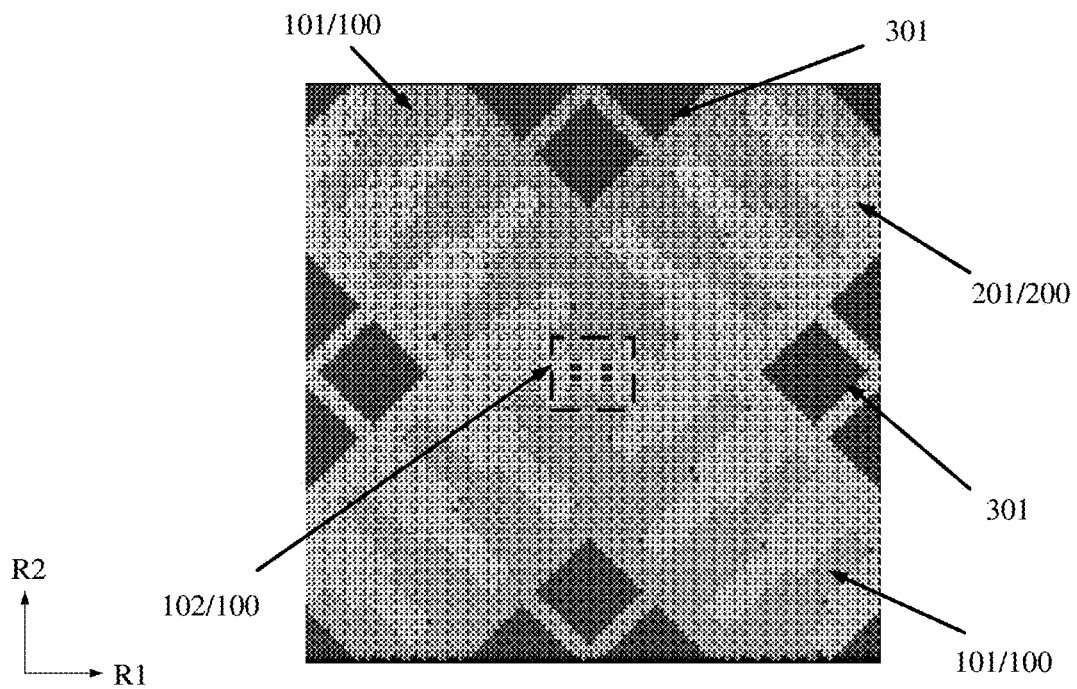
FIG. 5 is a schematic partial enlarged view of a planar structure of a touch substrate provided by some embodiments of the present disclosure.
Figure 6A:
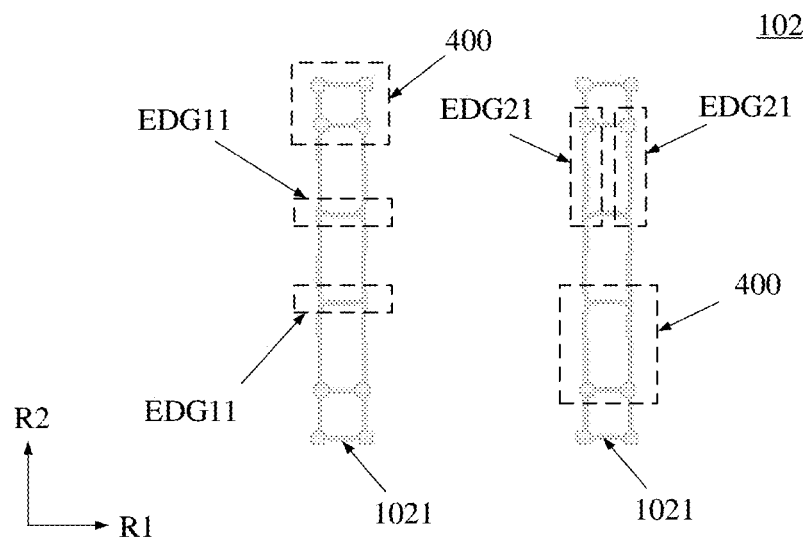
FIG. 6A is a schematic diagram of a first connection electrode provided by some embodiments of the present disclosure.
Figure 6B:
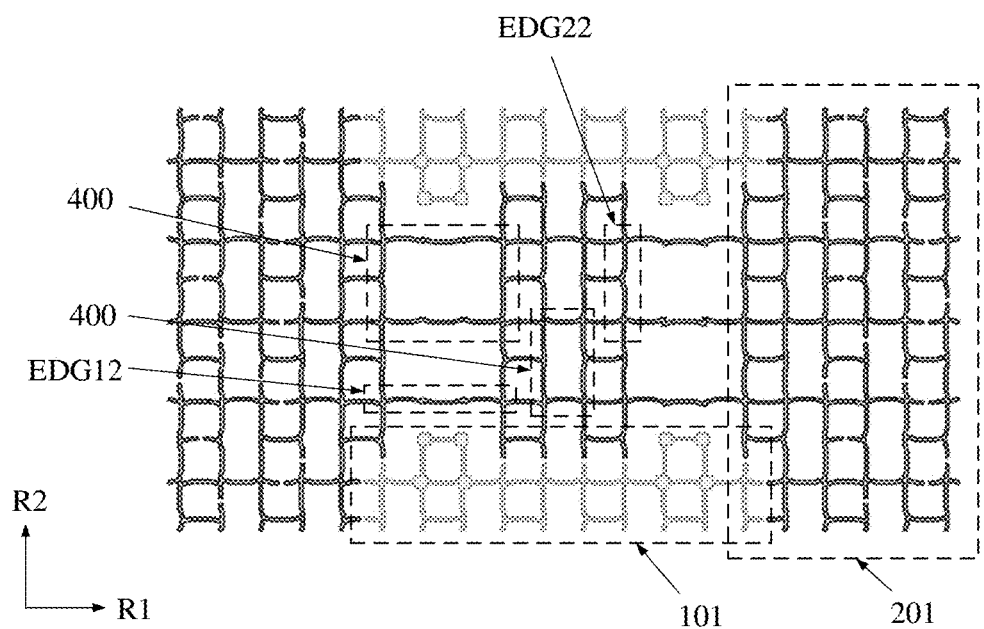
FIG. 6B is a schematic planar diagram of a partial structure of a second conductive layer of a touch substrate provided by some embodiments of the present disclosure.

FIG. 4A and FIG. 4B are schematic partial enlarged views of an example of a region RG1 illustrated in FIG. 2. FIG. 5 is a schematic partial enlarged view of a planar structure of a touch substrate provided by some embodiments of the present disclosure. For example, FIG. 5 illustrates an enlarged schematic diagram of a partial planar structure in the region RG1 shown in FIG. 2. FIG. 6A is a schematic diagram of a first connection electrode provided by some embodiments of the present disclosure. For example, FIG. 6A is a schematic diagram of the first connection electrode 102 shown in FIG. 4A and FIG. 4B, and FIG. 6A illustrates a planar structure of the first connection electrode 102 in the first conductive layer 310 shown in FIG. 3. FIG. 6B is a schematic planar diagram of a partial structure of a second conductive layer of a touch substrate provided by some embodiments of the present disclosure. For example, FIG. 6B illustrates a planar structure of the first touch sub-electrode 101, the second touch sub-electrode 201, and the second connection electrode 202 in the second conductive layer 320 shown in FIG. 3, and FIG. 6B is a schematic diagram of the first touch sub-electrode 101, the second touch sub-electrode 201, and the second connection electrode 202 shown in FIG. 4A and FIG. 4B.

It should be noted that, in order to clearly represent the first touch sub-electrode 101, the first connection electrode 102, the second touch sub-electrode 201, and the second connection electrode 202 in FIG. 4A to FIG. 6B, corresponding parts are roughly shown with dotted blocks. However, it needs to be noted that the dotted blocks are merely used to represent approximate positions of the first touch sub-electrode 101, the first connection electrode 102, the second touch sub-electrode 201, and the second connection electrode 202, rather than to represent limitations to specifically defined edges or boundaries of the respective electrodes.

As illustrated in FIG. 2 to FIG. 6B, the first touch electrode 100 and the second touch electrode 200 each include a grid structure formed by a plurality of conductive grids 400. For example, in the grid structure of the first touch electrode 100, the plurality of conductive grids 400 may be the same as or different from one another in the major contour and the area of the region defined thereby; and in the grid structure of the second touch electrode 200, the plurality of conductive grids 400 may be the same as or different from one another in the major contour and the area of the region defined thereby. The embodiments of the present disclosure are not specifically limited in this aspect.

As illustrated in FIG. 2 to FIG. 6B, in the overlapping region OVR, the first edge EDG1 (e.g., the first edge EDG11) extending in the first direction R1 in the conductive grid 400 of the first touch electrode 100 is spaced apart from the first edge EDG1 (e.g., the first edge EDG12) extending in the first direction R1 in the conductive grid 400 of the second touch electrode 200 in the second direction R2, so that the first edge EDG11 included in the conductive grid 400 of the first touch electrode 100 does not overlap with the first edge EDG12 included in the conductive grid 400 of the second touch electrode 200 in the direction R3 perpendicular to the base substrate 11. For example, in the overlapping region OVR, an orthographic projection of the first edge EDG11 extending in the first direction R1 in the conductive grid 400 of the first touch electrode 100 on the base substrate 11 does not overlap with an orthographic projection of the first edge EDG12 extending in the first direction R1 in the conductive grid 400 of the second touch electrode 200 on the base substrate 11, and the two orthographic projections have a certain distance therebetween in the second direction R2 (e.g., the distance is greater than 0).

Thus, an overlapping area of the first touch electrode 100 and the second touch electrode 200 in the overlapping region OVR may be reduced, thereby facilitating reducing the capacitance that can be formed between the first touch electrode 100 and the second touch electrode 200 in the overlapping region OVR and shortening the charging time needed. Thereby, when a value of the capacitance formed between the first touch electrode 100 and the second touch electrode 200 in the overlapping region OVR changes, time taken to obtain a variation of the value of the capacitance can be shortened, thus improving the touch control sensitivity and accuracy of the touch substrate 10.

It needs to be noted that in the above embodiments of the present disclosure, the conductive grid 400 of the first touch electrode 100 located in the overlapping region OVR includes the first edge EDG11; alternatively, in some other embodiments of the present disclosure, the conductive grid 400 of the first touch electrode 100 located in the overlapping region OVR may also not include the first edge EDG11, thereby avoiding overlapping with the first edge EDG12 included in the conductive grid 400 of the second touch electrode 200.

For example, as illustrated in FIG. 2 to FIG. 6B, the conductive grid 400 includes the first edges EDG1 (e.g., the first edges EDG11 and EDG12) extending in the first direction R1 and the second edges EDG2 (e.g., the second edges EDG21 and EDG22) extending in the second direction R2, and the first edges EDG1 and the second edges EDG2 are alternately connected to form the conductive grid 400.

For example, the first direction R1 may be perpendicular to the second direction R2, so as to form the conductive grid 400 having a square major contour shown in FIG. 4A to FIG. 6B, that is, the conductive grid 400 is a square conductive grid. Alternately, in some other embodiments of the present disclosure, the conductive grids 400 in the first touch electrode 100 and the second touch electrode 200 may also be formed into other regular shapes or irregular shapes, such as the triangle, rhombus, hexagon, octagon, strip, etc., and the embodiments of the present disclosure are not particularly limited in this aspect.

For example, as illustrated in FIG. 4A to FIG. 6B, in the overlapping region OVR, the second edge EDG2 (i.e., the second edge EDG21) extending in the second direction R2 in the conductive grid 400 of the first touch electrode 100 is spaced apart, in the first direction R1, from the second edge EDG2 (i.e., the second edge EDG22) extending in the second direction R2 in the conductive grid 400 of the second touch electrode 200, so that the second edge EDG21 included in the conductive grid 400 of the first touch electrode 100 does not overlap with the second edge EDG22 included in the conductive grid 400 of the second touch electrode 200 in the direction R3 perpendicular to the base substrate 11. For example, in the overlapping region OVR, an orthographic projection of the second edge EDG21 extending in the second direction R2 in the conductive grid 400 of the first touch electrode 100 on the base substrate 11 does not overlap with an orthographic projection of the second edge EDG22 extending in the second direction R2 in the conductive grid 400 of the second touch electrode 200 on the base substrate 11, and the two orthographic projections have a certain distance therebetween in the first direction R1 (e.g., the distance is greater than 0). Thus, the overlapping area of the first touch electrode 100 and the second touch electrode 200 in the overlapping region OVR may be further reduced.

It needs to be noted that in the above embodiments of the present disclosure, the conductive grid 400, located in the overlapping region OVR, of the second touch electrode 200 includes the second edge EDG22; alternatively, in some other embodiments of the present disclosure, the conductive grid 400, located in the overlapping region OVR, of the second touch electrode 200 may also not include the second edge EDG22, thereby avoiding overlapping with the second edge EDG21 included in the conductive grid 400 of the first touch electrode 100.

For example, as illustrated in FIG. 4A to FIG. 6B, in the overlapping region OVR, each first edge EDG11 in the conductive grid 400 of the first touch electrode 100 is located, in the second direction R2, between two adjacent first edges EDG12 in the second direction R2 in the conductive grid 400 of the second touch electrode 200. For example, in the overlapping region OVR, in the second direction R2, the first edge EDG1 in the conductive grid 400 of the first touch electrode 100 and the first edge EDG12 in the conductive grid 400 of the second touch electrode 200 are disposed alternately. That is, in the second direction R2, the orthographic projection of the first edge EDG11 in the conductive grid 400 of the first touch electrode 100 on the base substrate 11 and the orthographic projection of the first edge EDG12 in the conductive grid 400 of the second touch electrode 200 on the base substrate 11 are arranged alternately. Thus, the overlapping area of the first touch electrode 100 and the second touch electrode 200 in the overlapping region OVR may be reduced, which may be conducive to reducing the capacitance that can be formed between the first touch electrode 100 and the second touch electrode 200 in the overlapping region OVR, thereby shortening the charging time needed. Furthermore, the stability and reliability of signal transmission on the first touch electrode 100 and the second touch electrode 200 may also be improved, thereby realizing the optimization of the overall performance of the touch substrate 10.

For example, taking the embodiments shown in FIG. 2 to FIG. 6B as an example, the first connection electrode 102 and the second connection electrode 202 are located at least in part in the overlapping region OVR. For example, the first connection electrode 102 and the second connection electrode 202 are located partially in the overlapping region OVR and partially in the non-overlapping region.

The first connection electrode 102 and the second connection electrode 202 are respectively located in different conductive layers relative to the base substrate 11. The first connection electrode 102 and the second connection electrode 202 partially overlap with each other in the direction R3 perpendicular to the base substrate 11, so that the capacitor can be formed between the first connection electrode 102 of the first touch electrode 100 and the second connection electrode 202 of the second touch electrode 200 in the overlapping region OVR. Thus, the touch control function of the touch substrate 10 is realized by obtaining a change in the numerical value of the capacitor formed between the first connection electrode 102 and the second connection electrode 202 in the overlapping region OVR.

For example, with reference to FIG. 2 to FIG. 6B, the touch substrate 10 includes a first conductive layer 310, an insulating layer 330, and a second conductive layer 320 that are located on the base substrate 11. The insulating layer 330 is located between the first conductive layer 310 and the second conductive layer 320, and the first conductive layer 310 and the second conductive layer 320 are spaced apart and insulated from each other by the insulating layer 330 in the direction R3 perpendicular to the base substrate 11. The first touch sub-electrode 101 is located in the second conductive layer 320. The first connection electrode 102 is located in the first conductive layer 310. The first touch sub-electrode 101 is connected to the first connection electrode 102 by means of a via hole structure HS at least penetrating through the insulating layer 330.

For example, the second touch sub-electrode 201 and the second connection electrode 202 are both located in the second conductive layer 320. The second connection electrode 202 is arranged continuously between two adjacent second touch sub-electrodes 201. In other words, each second connection electrode 202 remains continuous between two adjacent second touch sub-electrodes 201 without interruption. For example, the second connection electrode may be disposed integrally with the two adjacent second touch sub-electrodes 201, e.g., may be formed from the same material layer (e.g., the second conductive layer 320) using the same preparation process.

For example, in the embodiments shown in FIG. 4A to FIG. 6B, the first connection electrode 102 includes two first connection sub-electrodes 1021 arranged in parallel in the first direction R1, and the two first connection sub-electrodes 1021 are located between two adjacent first touch sub-electrodes 101 in the second direction R2. Two ends of each first connection sub-electrode 1021 are connected to the two first touch sub-electrodes 101 through the via hole structures HS, respectively, to realize signal transmission between the two first touch sub-electrodes 101.

It needs to be noted that the embodiments of the present disclosure have no particular limitations on the number, positions, arrangement manner, or the like of via holes included in the via hole structure HS for connecting the first touch sub-electrode 101 to the corresponding connection sub-electrode 1021. For example, in the embodiments shown in FIG. 4A and FIG. 4B, the via hole structure HS for connecting the first touch sub-electrode 101 to the corresponding first connection sub-electrode 1021 includes four via holes that correspond to four vertices of one conductive grid 400, respectively. For another example, in the following embodiments shown in FIG. 11A, FIG. 12A to FIG. 12B, and FIG. 13A and FIG. 13B, the four via holes in the via hole structure HS for connecting the first touch sub-electrode 101 to the corresponding first connection sub-electrode 1021 may be disposed correspondingly at four vertices of a "8"-shaped structure formed by two adjacent conductive grids 400. For example, in the examples shown in FIG. 12A and FIG. 12B, the four via holes are disposed at four vertices not shared by the two adjacent conductive grids 400, respectively, to appropriately increase the distance between each sub-pixel 500 in the vicinity of the via hole structure HS and each vertex and edge of the corresponding conductive grid 400 (details may be referred to the following corresponding description regarding the example shown in FIG. 12A and FIG. 12B). Thus, not only normal display of each sub-pixel 500 can be guaranteed, but the risk of color shift possibly occurring between two adjacent sub-pixels 500 can also be weakened or avoided.

Alternatively, in some other embodiments of the present disclosure, the via holes included in the via hole structure HS may also be disposed in other appropriate ways. The number of the via holes included in the via hole structure HS may also be one, two, three, five, six or more, which will not be particularly limited in the embodiments of the present disclosure.

For example, in the embodiments shown in FIG. 2 to FIG. 6B, the first connection electrode 102 includes two first connection sub-electrodes 1021 extending in the second direction R2. However, in some other embodiments of the present disclosure, the first connection electrode 102 may also include only one first connection sub-electrode 1021 extending in the second direction R2, or may also include three, four, five or more first connection sub-electrodes 1021 extending in the second direction R2, and the plurality of first connection sub-electrodes 1021 are arranged in sequence in the first direction R1. The embodiments of the present disclosure have no particular limitation on the number of the first connection sub-electrodes 1021 included in the first connection electrode 102.

For example, in the embodiments shown in the FIG. 2 to FIG. 6B, each first connection sub-electrode 1021 includes, in the overlapping region OVR, two first edges EDG11 disposed in sequence in the second direction R2. However, in some other embodiments of the present disclosure, the number of the first edges EDG11 included in each first connection sub-electrode 1021 in the overlapping region OVR may also be different, and the number of the first edges EDG11 included in the first connection sub-electrode 1021 in the overlapping region OVR may also be one, three, four or more. Alternatively, the first connection sub-electrode 1021 may also have no first edge EDG11 in the overlapping region OVR, and the embodiments of the present disclosure are not particularly limited in this aspect.

For example, with reference to FIG. 2 to FIG. 6B, two first connection sub-electrodes 1021 are arranged in sequence in the first direction R1 and extend in directions substantially parallel to each other. For example, the two first connection sub-electrodes 1021 respectively extend roughly in the second direction R2 as a whole.

For example, each first connection sub-electrode 1021 is formed by a plurality of conductive grids 400, and in the overlapping region OVR, centers of adjacent conductive grids 400 in the first connection sub-electrode 1021 in the second direction R2 are roughly located in the same straight line extending in the second direction R2, thereby allowing the first connection sub-electrode 1021 to have a vertical ladder-shaped conductive structure formed by conductive grids 400 between two adjacent first touch sub-electrodes 101. For example, the conductive grids 400 forming the first connection sub-electrode 1021 may be the same in width in the first direction R1, thereby improving the consistency and stability of signal transmission on the formed vertical ladder-shaped conductive structure.

For example, in the embodiments shown in FIG. 2 to FIG. 6B, the second connection electrode 202 includes three second connection sub-electrodes 2021 arranged in parallel in the second direction R2. For example, each second connection sub-electrode 2021 is formed by sequentially connecting the first edges EDG12 of multiple adjacent conductive grids 400 in the first direction R1, thereby forming a linear conductive structure extending roughly in the first direction R1 as a whole and hence realizing signal transmission between two adjacent second touch sub-electrodes 201 in the first direction R1.

It needs to be noted that in the embodiments shown in FIG. 2 to FIG. 6B, the second connection electrode 202 includes three second connection sub-electrodes 2021 extending in the first direction R1. However, in some other embodiments of the present disclosure, the second connection electrode 202 may also include only one second connection sub-electrode 2021 extending in the first direction R1, or may also include two, four, five or more second connection sub-electrodes 2021 extending in the first direction R1, and the plurality of second connection sub-electrodes 2021 are arranged in sequence in the second direction R2. The embodiments of the present disclosure have no particular limitation on the number of the second connection sub-electrodes 2021 included in the second connection electrode 202.

For example, in the embodiments shown in FIG. 2 to FIG. 6B, the two first connection sub-electrodes 1021 have a distance therebetween in the first direction R1. A plurality of second connection sub-electrodes 2021 of the second connection electrode 202 are further electrically connected to one another by a plurality of second edges EDG22 between the two first connection sub-electrodes 1021, and a plurality of first edges EDG12 are further correspondingly disposed between the plurality of second edges EDG22. Thus, in the overlapping region OVR, the second connection electrode 202 is further designed to have a plurality of conductive grids 400 for connecting the plurality of second connection sub-electrodes 2021 formed between the two first connection sub-electrodes 1021, thereby further improving the stability and reliability of signal transmission on the second connection electrode 202.

It needs to be noted that, in some other embodiments of the present disclosure, the distance between two first connection sub-electrodes 1021 in the first direction R1 may also be reduced, and the second edge EDG22 for connecting two adjacent second connection sub-electrodes 2021 is not provided in the second connection electrode 202; alternatively, the distance between two first connection sub-electrodes 1021 in the first direction R1 may also be further increased, so that more second edges EDG22 for connecting two adjacent second connection sub-electrodes 2021 can be provided in the second connection electrode 202. The embodiments of the present disclosure are not particularly limited in this aspect.

For example, with reference to the partial enlarged schematic diagram of a partial planar structure in the region RG1 shown in FIG. 5, two first connection sub-electrodes 1021 in the first connection electrode 102 are located between two adjacent first touch sub-electrodes 101 in the second direction R2, and connected to the two first touch sub-electrodes 101, respectively, thereby realizing signal transmission between the two first touch sub-electrodes 101. For example, the two first connection sub-electrodes 1021 are disposed substantially in parallel and respectively extend roughly in the second direction R2, thereby forming a connection structure similar to a vertical ladder shape between two adjacent first touch sub-electrodes 101.

For example, the overall extending directions of the two first connection sub-electrodes 1021 may be completely parallel (e.g., 100% parallel) and be the second direction R2, so as to form the vertical ladder-shaped connection structure; alternatively, an included angle of greater than 0° may be formed between the overall extending directions of the two first connection sub-electrodes 1021. For example, the numerical range of the included angle may be greater than 0° and less than or equal to 20°, e.g., may be particularly 2°, 5°, 8°, 10°, 12°, 15°, 18°, or the like, and the embodiments of the present disclosure are not particularly limited in this aspect.

For example, in the first touch sub-electrode 101 and the first connection electrode 102, each edge line formed by the first edge EDG11 and extending in the first direction R1 and each edge line formed by the second edge EDG21 and extending in the second direction R2 may be shaped into a linear shape, a folding line shape, an arc shape, a curve shape, etc., or may also be shaped into a combination of the shapes mentioned above or other appropriate shapes; in the second touch sub-electrode 201 and the second connection electrode 202, each edge line formed by the first edge EDG12 and extending in the first direction R1 and each edge line formed by the second edge EDG22 and extending in the second direction R2 may be shaped into a linear shape, a folding line shape, an arc shape, a curve shape, etc., or may also be shaped into a combination of the shapes mentioned above or other appropriate shapes. The embodiments of the present disclosure are not particularly limited in this aspect.

For example, in some embodiments of the present disclosure, as illustrated in FIG. 5, in the grid structures of the first touch electrode 100 and the second touch electrode 200, a notch may be formed in the first edge EDG1 or the second edge EDG2 of the conductive grid 400 to form one or more floating electrode portions 301 in the grid structures of the first touch electrode 100 and the second touch electrode 200. The floating electrode portion 301 may be configured to be in a suspended state or a floating state. For example, the floating electrode portion 301 is not connected to any signal source or conductive structure (e.g., the first touch electrode 100 or the second touch electrode 200). Thus, it is conducive to weakening or avoiding potential mutual interference between the first touch electrode 100 and the second touch electrode 200 and between other traces, devices or structures in the touch substrate and the first touch electrode 100 or the second touch electrode 200, thereby improving the stability and reliability of the touch substrate.

For example, in the embodiments shown in FIG. 2 to FIG. 6B, the second conductive layer 320 is located on a side of the first conductive layer 310 away from the base substrate 11. Alternatively, in some other embodiments of the present disclosure, the first conductive layer 310 may also be located on a side of the second conductive layer 320 away from the base substrate 11.

For example, in the embodiments shown in FIG. 2 to FIG. 6B, the second conductive layer 320 may be a conductive layer closer to the side of the user than the first conductive layer 310. Thus, in the case that the first touch sub-electrode 101, the second touch sub-electrode 201, and the second connection electrode 202 are all located in the second conductive layer 320, the accuracy and sensitivity of signals received by the first touch electrode 100 and the second touch electrode 200 from the side of the user can be improved, thereby improving the sensitivity and accuracy of the touch substrate 10.

In some embodiments of the present disclosure, as illustrated in FIG. 4A to FIG. 6B, the area of the region defined by the conductive grid 400 of the first touch electrode 100 in the overlapping region OVR is greater than or equal to that of the region defined in the non-overlapping region. For example, the area of the square region defined by the conductive grid 400 of the first connection electrode 102 in the overlapping region OVR may be greater than that of the square region defined by the conductive grid 400 of the first connection electrode 102 or the first touch sub-electrode 101 in the non-overlapping region.

For example, the square regions defined by the conductive grids 400 in the first connection electrode 102 and the first touch sub-electrode 101 in the non-overlapping region are substantially the same in major contour, area, and the like. Taking that the area of the square regions defined by the conductive grids 400 in the first connection electrode 102 and the first touch sub-electrode 101 in the non-overlapping region is one unit area as an example, the area of the rectangular region defined by the conductive grids 400 in the first connection electrode 102 in the overlapping region OVR is about two unit areas.

In some embodiments of the present disclosure, as illustrated in FIG. 4A to FIG. 6B, the area of the region defined by the conductive grid 400 in the second touch electrode 200 in the overlapping region OVR is greater than or equal to that of the region defined in the non-overlapping region. For example, the area of the square region defined by the conductive grids 400 in the second connection electrode 202 in the overlapping region OVR is greater than or equal to that of the square region defined by the conductive grids 400 in the second connection electrode 202 or the second touch sub-electrode 201 in the non-overlapping region.

For example, the square regions defined by the conductive grids 400 in the second connection electrode 202 and the second touch sub-electrode 201 in the non-overlapping region are substantially the same in major contour, area, and the like. Taking that the area of the square regions defined by the conductive grids 400 in the second connection electrode 202 and the second touch sub-electrode 201 in the non-overlapping region is one unit area as an example, the area of the square region defined by the conductive grids 400 in the second connection electrode 202 in the overlapping region OVR is about one unit area, two unit areas, or six unit areas.

Thus, the area of the region defined by the conductive grids 400 in the first touch electrode 100 in the overlapping region OVR is greater than or equal to that of the region defined in the non-overlapping region, and the area of the region defined by the conductive grids 400 in the second touch electrode 200 in the overlapping region OVR is greater than or equal to that of the region defined in the non-overlapping region, so that the area occupied, in the overlapping region OVR, by edges (e.g., the first edge EDG1 and the second edge EDG2) of the conductive grids 400 for transmitting electrical signals in the grid structures of the first touch electrode 100 and the second touch electrode 200 can be reduced. Thus, the overlapping area of the first touch electrode 100 and the second touch electrode 200 in the overlapping region OVR may be further reduced, thereby shortening the charging time needed.

In some embodiments of the present disclosure, as illustrated in FIG. 4A to FIG. 6B, the arrangement density of the conductive grids 400 in the first touch electrode 100 in the overlapping region OVR is smaller than or equal to that in the non-overlapping region. For example, in a plane parallel to the base substrate 11, for two different sub-regions having the same area and respectively located in the overlapping region OVR and the non-overlapping region, e.g., a first sub-region located in the overlapping region OVR and a second sub-region located in the non-overlapping region, the number of the conductive grids 400 included in the grid structure of the first touch electrode 100 in the first sub-region is smaller than or equal to that of the conductive grids 400 included in the second sub-region.

In some embodiments of the present disclosure, as illustrated in FIG. 4A to FIG. 6B, the arrangement density of the conductive grids 400 in the second touch electrode 200 in the overlapping region OVR is smaller than or equal to that in the non-overlapping region. That is, in the plane parallel to the base substrate 11, for two different sub-regions having the same area and respectively located in the overlapping region OVR and the non-overlapping region, e.g., a third sub-region located in the overlapping region OVR and a fourth sub-region located in the non-overlapping region, the number of the conductive grids 400 included in the grid structure of the second touch electrode 200 in the third sub-region is smaller than or equal to that of the conductive grids 400 included in the fourth sub-region.

Thus, the area occupied, in the overlapping region OVR, by edges (e.g., the first edge EDG1 and the second edge EDG2) of the conductive grids 400 for transmitting electrical signals in the grid structures of the first touch electrode 100 and the second touch electrode 200 can be reduced. Thus, the overlapping area of the first touch electrode 100 and the second touch electrode 200 in the overlapping region OVR may be further reduced, thereby shortening the charging time needed.

In some embodiments of the present disclosure, the conductive grid 400 is a metal grid. For example, the metal grids in the grid structures of the first touch electrode 100 and the second touch electrode 200 may be made of a material including metal materials such as aluminum, molybdenum, copper or silver, or an alloy material of such metal materials, e.g., a silver-molybdenum-copper alloy material, which will not be particularly limited in the embodiments of the present disclosure.

It needs to be noted that the pattern (e.g., the contour, number, size and shape of conductive grids) of the grid structure shown in FIG. 2 to FIG. 6B is merely illustrated exemplarily. The embodiments of the present disclosure have no particular limitations on the number and specific pattern characteristics (such as the shape, contour, or size) of the conductive grids 400 formed in the grid structure. For example, the conductive grids 400 in the grid structure may all be polygonal, e.g., quadrangular. However, in some other embodiments of the present disclosure, the shape of the conductive grid 400 may also be other polygons, such as the triangle, pentagon and hexagon, which may be specifically designed according to actual requirements. The embodiments of the present disclosure have no limitations on the specific shape, size or the like of the conductive grid 400.

Figure 7:
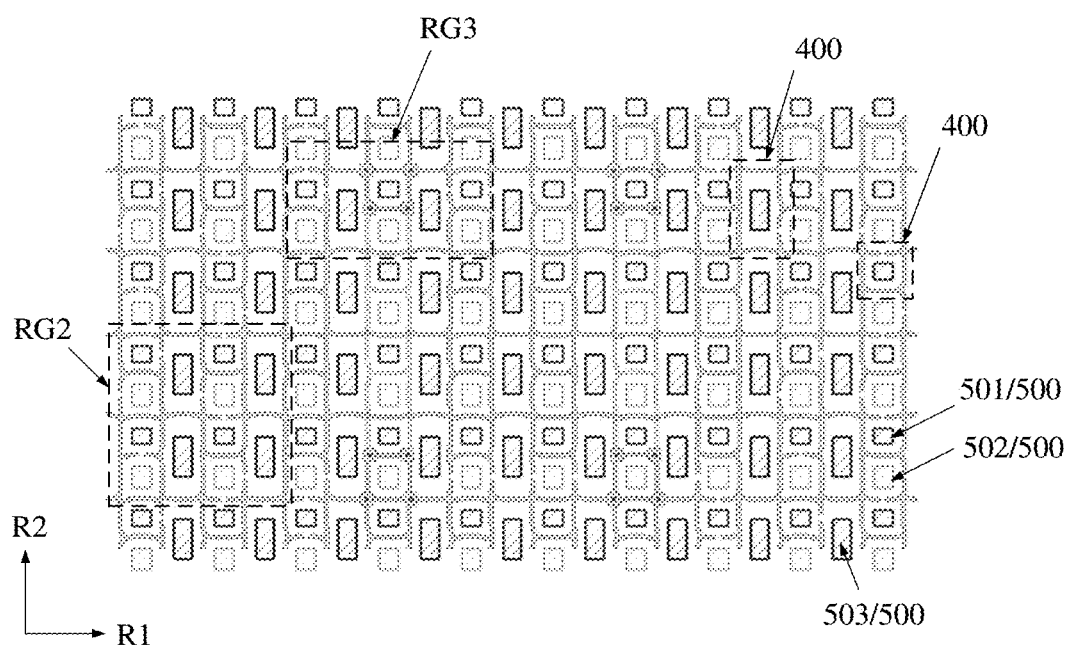
FIG. 7 is a schematic planar diagram of a touch substrate for being stacked with a display device provided by some embodiments of the present disclosure.
Figure 8A:
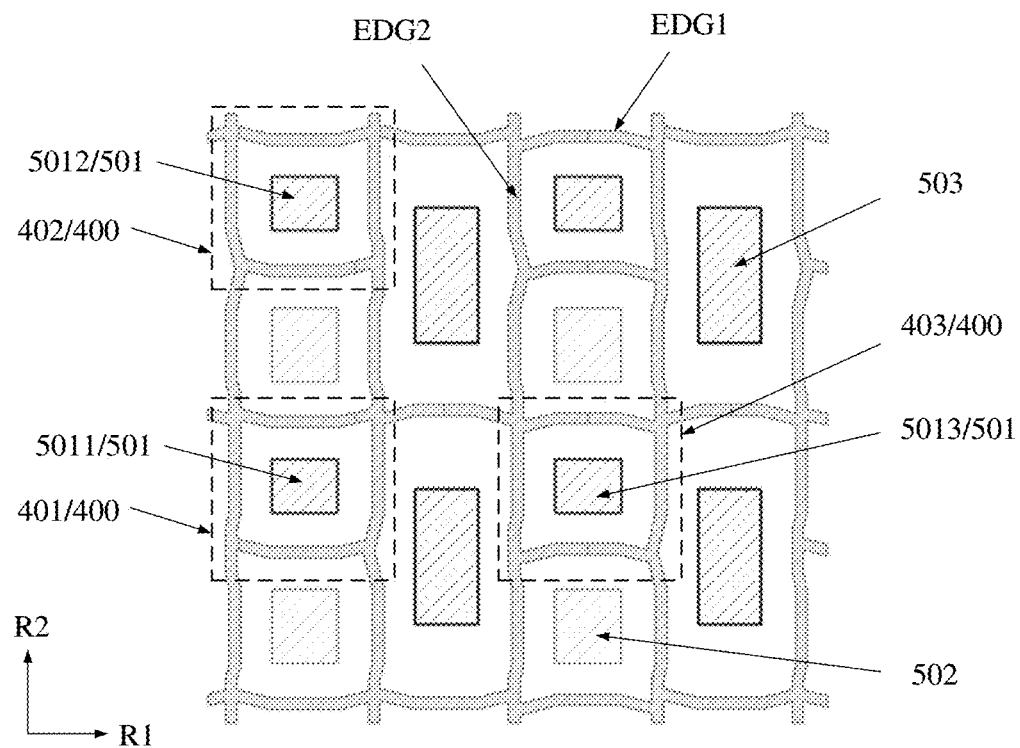
FIG. 8A is a schematic partial enlarged view of an example of a region RG2 illustrated in FIG. 7.

FIG. 7 is a schematic planar diagram of a touch substrate for being stacked with a display device provided by some embodiments of the present disclosure. For example, FIG. 7 illustrates a positional correspondence between the first touch electrode 100 and the second touch electrode 200 in FIG. 4A and FIG. 4B and sub-pixels 500 in the display device in the plane parallel to the base substrate 11. FIG. 8A is a schematic partial enlarged view of an example of a region RG2 illustrated in FIG. 7, and FIG. 8B is a schematic partial enlarged view of an example of a region RG3 illustrated in FIG. 7.

Figure 8B:
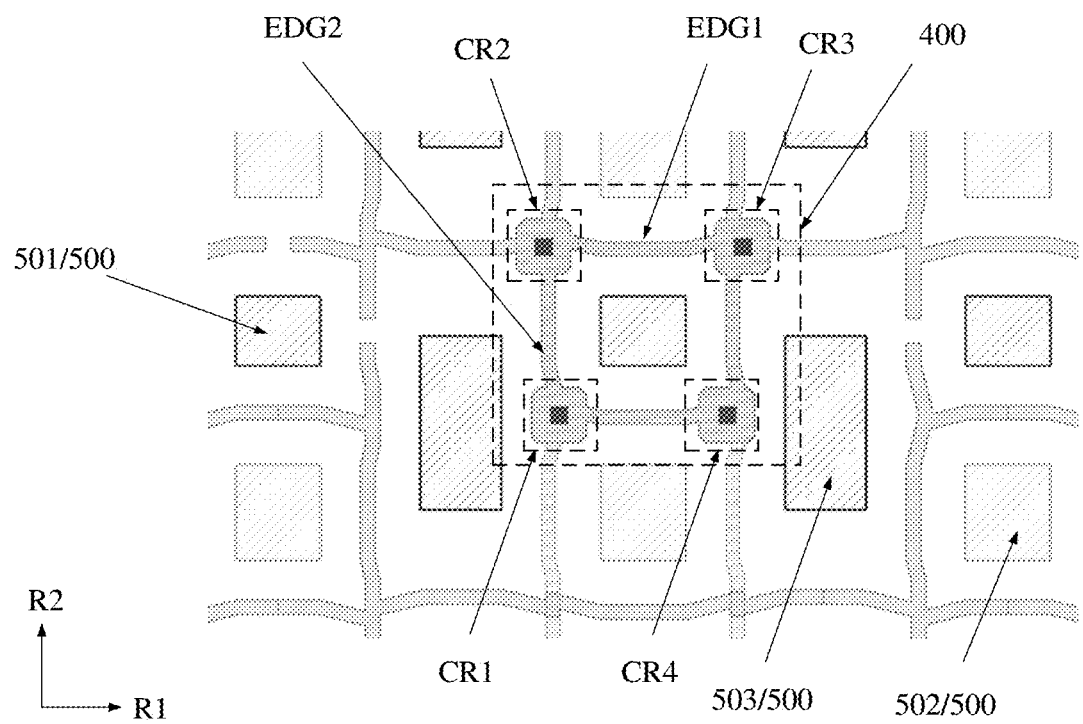
FIG. 8B is a schematic partial enlarged view of an example of a region RG3 illustrated in FIG. 7.

It needs to be noted that except for the sub-pixels 500 in the display device, the touch substrate 10 in the embodiments shown in FIG. 7 to FIG. 8B is substantially the same as or similar to that in the embodiments shown in FIG. 2 to FIG. 6B in structure, setting manner, function, etc., and the specific contents may refer to the corresponding descriptions regarding the embodiments shown in FIG. 2 to FIG. 6B, which will not be described here redundantly.

As illustrated in FIG. 7 to FIG. 8B, the touch substrate 10 is configured to be stacked with the display device, the display device includes a plurality of pixel units arranged in an array, and each pixel unit includes a plurality of sub-pixels 500 (e.g., sub-pixels 501-503). Each sub-pixel 500 corresponds to one conductive grid 400, and the orthographic projection of each sub-pixel 500 on the base substrate 11 is located within a region defined by the orthographic projection of the corresponding conductive grid 400 on the base substrate 11.

It needs to be noted that in some other embodiments of the present disclosure, one conductive grid 400 may correspond to a plurality of sub-pixels 500, and the orthographic projection of each of the plurality of sub-pixels 500 on the base substrate 11 is located within the region defined by the orthographic projection of the corresponding conductive grid 400 on the base substrate 11. For example, the sub-pixels 501-503 in one pixel unit all correspond to the same conductive grid 400. The embodiments of the present disclosure have no particular limitation on the specific number of the sub-pixels 500 corresponding to one conductive grid 400.

For example, in the embodiments shown in FIG. 7 to FIG. 8B, the sub-pixels 501-503 are different in size. That is, the regions defined by the orthographic projections of the sub-pixels 501-503 on the base substrate 11 are different in area from one another.

For example, taking three sub-pixels 501-503 having different sizes in the embodiments shown in FIG. 7 to FIG. 8B as an example, the sub-pixel 501 having the relatively minimum size corresponds to the conductive grid 400 for forming the via hole structure HS in the touch electrode. In some other embodiments of the present disclosure, the conductive grid 400 for forming the via hole structure HS in the touch electrode may also correspond to the sub-pixel 502 or the sub-pixel 503 having a relatively larger size. Thus, it may be helpful to increase a relative distance between the vertices of the conductive grid 400 for forming the via hole structure HS in the touch electrode, thereby being conducive to not only the optimization of the preparation process of the touch substrate but also weakening potential signal interference between adjacent via hole structures HS.

For example, the edge of the conductive grid 400 extends in a folding line shape. For example, the first edge EDG1, extending in the first direction R1, and the second edge EDG2, extending in the second direction R2, of the conductive grid 400 respectively extend in the folding line shape. For example, a bending angle of the edge of the conductive grid 400 may be 10°-20°, further preferably 12°-18°, such as 12°, 14°, 15°, 16°, 18°, etc.

Thus, the potential interference between the grid structures of the first touch electrode 100 and the second touch electrode 200 and the sub-pixel array may be reduced or avoided, thereby being conductive to weakening or avoiding electrode visualization phenomenon and hence realizing the optimization of the optical performance of the touch substrate 10. Meanwhile, potential phenomena such as spot-like, linear or blocky dark-state etching or mura patterns potentially occurring in a display picture may also be weakened or avoided, thereby weakening or avoiding potential visual poor display in the display picture and improving the display effect of the picture.

For example, the first edge EDG1 and the second edge EDG2 of the conductive grid 400 may also respectively extend in a curve shape, an arc shape, or other appropriate shapes, which will not be particularly limited in the embodiments of the present disclosure.

In the touch substrate provided by the embodiments of the present disclosure, the edge of the conductive grid 400 is designed to extend in the folding line shape, the arc shape, or the curve shape (e.g., a waved curve shape), and the directions of curvature at different positions on the edge of the conductive grid 400 may be different. Thus, potential reflection phenomenon by each edge of the conductive grid 400 can be weakened, thereby effectively reducing the macroscopic visualization of the touch electrode, e.g., reducing the visual phenomenon at the edge of the touch electrode. Meanwhile, potential interference between the edges of the conductive grid 400 can also be weakened, thereby effectively reducing the microscopic luminance difference in one direction or within one region and thus improving the display quality of the display product using the touch substrate.

For example, taking the first edge EDG1 and the second edge EDG2 of the conductive grid 400 being in the arc shape as an example, at the joint of the first edge EDG1 and the second edge EDG2, an included angle between the tangent line of the arc-shaped first edge EDG1 and the first direction R1 may be about 12° to 18°, e.g., about 14°, and an included angle between the tangent line of the arc-shaped second edge EDG2 and the second direction R2 may be about 12° to 18°, e.g., about 14°.

In the touch substrate provided by the embodiments of the present disclosure, the included angle between the first edge EDG1 and the first direction R1 and the included angle between the second edge EDG2 and the second direction R2 are set to be about 12° to 18°, so that the shadow elimination effect can be improved to the utmost extent and the edge visualization phenomenon of the touch electrode can be reduced.

It needs to be noted that in some other embodiments of the present disclosure, for one conductive grid 400, one of two first edges EDG1 is in the folding line or curve shape, while the other is in the straight line shape; or one of two second edges EDG2 is in the folding line or curve shape, while the other is in the straight line shape. The embodiments of the present disclosure are not particularly limited in this aspect.

For example, a plurality of sub-pixels 500 are respectively configured to provide light different in color. For example, sub-pixels 501-503 may be respectively configured to provide light different in color, e.g., configured to provide red light, blue light, green light, and the like, respectively. The embodiments of the present disclosure are not particularly limited in this aspect.

For example, taking sub-pixels 501 providing light of the same color as an example, as illustrated in FIG. 7 and FIG. 8A, the plurality of sub-pixels 501 include a first sub-pixel 5011 and a second sub-pixel 5012 arranged in the second direction R2. For example, in the plurality of sub-pixels 501 arranged in the second direction R2, the first sub-pixel 5011 and the second sub-pixel 5012 are adjacent to each other in the second direction R2, that is, in the second direction R2, no other sub-pixel 501 is provided between the first sub-pixel 5011 and the second sub-pixel 5012. A bending direction of the second edge EDG2 of the conductive grid 401 corresponding to the first sub-pixel 5011 and a bending direction of the second edge EDG2 of the conductive grid 402 corresponding to the second sub-pixel 5012 are opposite to each other in the first direction R1. For example, the second edges EDG2 of the conductive grid 401 are all bent rightwards (i.e., protrude rightwards). For example, the second edge EDG2 is in the folding line shape similar to a V shape that opens leftwards. The second edges EDG2 of the conductive grid 402 are all bent leftwards (i.e., protrude leftwards). For example, the second edge EDG2 is in the folding line shape similar to a V shape that opens rightwards. Thus, the bending direction of the second edge EDG2 of the conductive grid 401 and the bending direction of the second edge EDG2 of the conductive grid 402 are opposite to each other in the first direction R1, thereby weakening or avoiding the risk of color offset possibly occurring between two adjacent sub-pixels 501 in the second direction R2.

For example, as illustrated in FIG. 7 and FIG. 8A, the plurality of sub-pixels 501 further include a third sub-pixel

5013, and the third sub-pixel 5013 and the first sub-pixel 5011 are arranged in the first direction R1. For example, in the plurality of sub-pixels 501 arranged in the first direction R1, the first sub-pixel 5011 and the third sub-pixel 5013 are adjacent to each other in the first direction R1, that is, in the first direction R1, no other sub-pixel 501 is provided between the first sub-pixel 5011 and the third sub-pixel 5013. The bending direction of the first edge EDG1 of the conductive grid 401 corresponding to the first sub-pixel 5011 and the bending direction of the first edge EDG1 of the conductive grid 403 corresponding to the third sub-pixel 5013 are opposite to each other in the second direction R2. For example, the first edges EDG1 of the conductive grid 401 are all bent downwards (i.e., protrude downwards). For example, the first edge EDG1 is in the folding line shape similar to a V shape that opens upwards. The first edges EDG1 of the conductive grid 403 are all bent upwards (i.e., protrude upwards). For example, the first edge EDG1 is in the folding line shape similar to a V shape that opens downwards. Thus, the bending direction of the first edge EDG1 of the conductive grid 401 and the bending direction of the first edge EDG1 of the conductive grid 403 are opposite to each other in the second direction R2, thereby weakening or avoiding the risk of color offset possibly occurring between two adjacent sub-pixels 501 in the first direction R1.

It needs to be noted that the above-mentioned "bending direction" refers to the overall contour of the edge of the conductive grid 400. For example, the above-mentioned "similar to a V shape" refers to that the overall contour of the edge shape of the conductive grid 400 is similar to the V shape. Two line segments joined to each other to form the V shape may be straight line segments extending linearly, or may also be line segments extending, for example, in the folding line shape, zigzag shape or other appropriate shapes. In other words, the embodiments of the present disclosure have no limitation on the specific shape of the two line segments of the edges of the conductive grid 400. For example, the edges of the two line segments may be in a shape including a linear shape, a folding line shape, a zigzag shape, a triangle, a waved shape, or other appropriate shapes, which will not be particularly limited in the embodiments of the present disclosure.

For example, a distance between each sub-pixel 500 and the edge or vertex of the corresponding conductive grid 400 is within a preset range. For example, the preset range may be from 8 µm to 15 µm. For example, further, the distance between each sub-pixel 500 and the edge or vertex of the corresponding conductive grid 400 may range from 8 µm to 10 µm, e.g., 9 µm.

For example, the minimum distance between each sub-pixel 500 and each edge of the corresponding conductive grid 400 may be set from 8 µm to 10 µm, e.g., 9 µm, so that potential adverse effects of the grid pattern in the touch electrode on light emission performance can be effectively reduced.

For example, taking the sub-pixel 501 in the region RG3 shown in FIG. 7 as an example, as illustrated in FIG. 8B, the distances between the sub-pixel 501 and two first edges EDG1 opposite to each other in the second direction R2 are substantially consistent with the distances between the sub-pixel 501 and two second edges EDG2 opposite to each other in the first direction R1, and the distances between the sub-pixel 501 and the vertices (e.g., vertices CR1~CR4) of the conductive grid 400 are all substantially consistent.

For example, the extending lengths, extending directions, angles and the like of the first edge EDG1 and the second edge EDG2 of the conductive grid 400 corresponding to the sub-pixel 501 may be adjusted properly, so that the distance between the sub-pixel 501 and each edge of the corresponding conductive grid 400 is kept within the preset range, e.g., substantially close to the same value. Alternatively, the relative positions of the vertices CR1~CR4 of the conductive grid 400 may also be adjusted properly, so that the distance between the sub-pixel 501 and each vertex of the corresponding conductive grid 400 is kept within the present range, e.g., substantially close to the same value.

For example, as illustrated in FIG. 8B, in the conductive grid 400, the vertex CR1 on the lower left is closer to the right side than the vertex CR2 on the upper left, and the vertex CR4 on the lower right is closer to the left side than the vertex CR3 on the upper right, so that the distances between the sub-pixel 501 and the vertices CR1~CR4 of the conductive grid 400 are substantially consistent. Thus, the potential interference between the conductive grids 400 in the grid structures of the first touch electrode 100 and the second touch electrode 200, and the sub-pixels 500 may be reduced or avoided, thereby realizing further optimization of the optical performance of the touch substrate 10.

For example, in any one conductive grid 400, a notch may be formed in at least one edge (e.g., the first edge EDG1 and/or the second edge EDG2) of the conductive grid 400, and an annular grid pattern is broken by the notch. For example, the notch may be an imaginary line that cuts the first edge EDG1 or the second edge EDG2.

Figure 9:
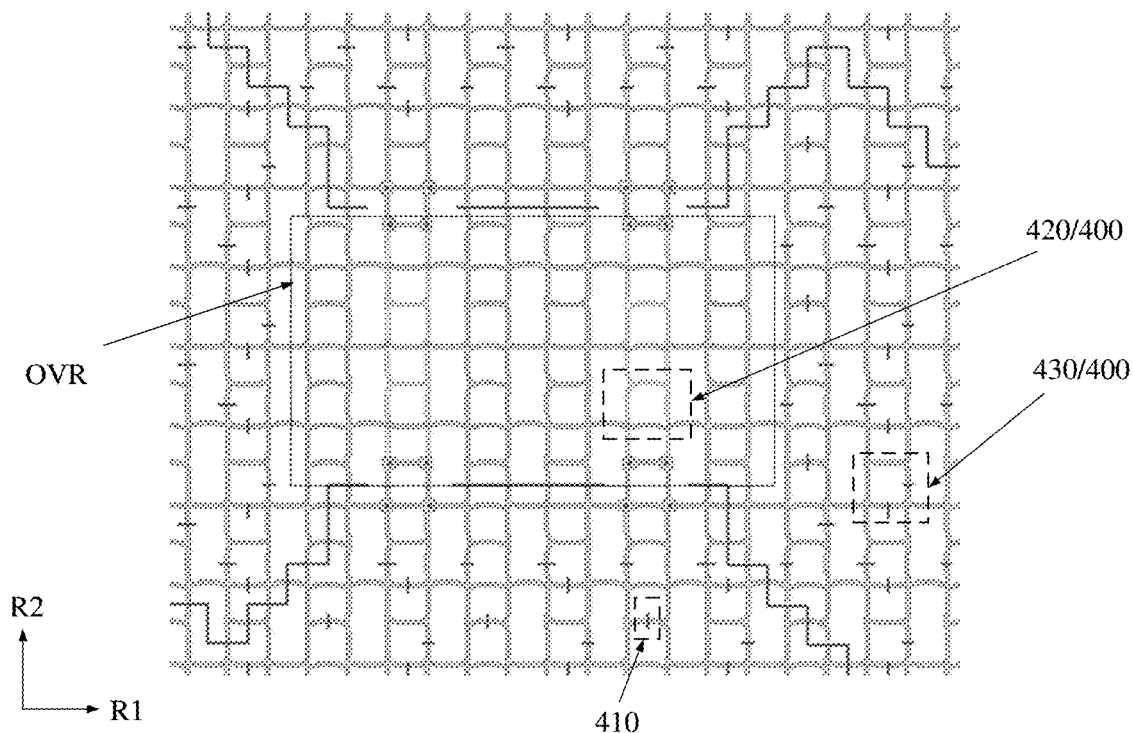
FIG. 9 is a schematic diagram of a setting manner of a notch in a grid structure provided by some embodiments of the present disclosure.

FIG. 9 is a schematic diagram of a setting manner of a notch in a grid structure provided by some embodiments of the present disclosure. For example, FIG. 9 illustrates a setting manner of notches in the grid structures of the first touch electrode 100 and the second touch electrode 200 in FIG. 4A and FIG. 4B. It should be noted that except for the notch 410 in the conductive grid 400, the touch substrate 10 in the embodiments shown in FIG. 9 is substantially the same as or similar to that in the embodiments shown in FIG. 2 to FIG. 6B in structure, setting method, function, etc., and the specific contents may refer to the corresponding descriptions regarding the embodiments shown in FIG. 2 to FIG. 6B, which will not be described here redundantly.

In some embodiments of the present disclosure, as illustrated in FIG. 9, the conductive grid 400 includes a closed grid 420, and further includes a non-closed grid 430 having one or more notches 410 in the edge of the conductive grid 400. In the first touch electrode 100, the number of notches 410 in the conductive grid 400 located in the non-overlapping region is greater than or equal to that of notches 410 in the conductive grid 400 located in the overlapping region OVR. In the second touch electrode 200, the number of notches 410 in the conductive grid 400 located in the non-overlapping region is greater than or equal to that of notches 410 in the conductive grid 400 located in the overlapping region OVR. Thus, the signal transmission loads of the first touch electrode 100 and the second touch electrode 200 in the overlapping region OVR may be reduced, and the signal transmission effect of the first touch electrode 100 and the second touch electrode 200 may be improved.

For example, the conductive grids 400, located in the overlapping region OVR, in the first touch electrode 100 are all closed grids 420, and the conductive grids 400, located in the overlapping region OVR, in the second touch electrode 200 are all closed grids 420. That is, in the overlapping region OVR, no notch is formed in each edge of the conductive grid 400, so that the conductive grids 400 in the overlapping grid OVR are all closed grids 420. Thus, the signal transmission loads of the first touch electrode 100 and the second touch electrode 200 in the overlapping region OVR may be reduced, and the signal connection effect of the first connection electrode 102 between two adjacent first touch sub-electrodes 101 and the signal connection effect of the second connection electrode 202 between two adjacent second touch sub-electrodes 201 may be improved, thereby improving the stability and reliability of signal transmission of the first touch electrode 100 and the second touch electrode 200 in the overlapping region OVR.

It should be noted that the numbers, shapes, sizes and the like of the closed conductive grids 420 and non-closed conductive grids 430 shown in FIG. 9 are illustrated exemplarily, and the embodiments of the present disclosure are not particularly limited in this aspect.

For example, in the above embodiments of the present disclosure, the conductive grids 400 for forming the via hole structure HS in the first touch electrode 100 are all closed grids 420. That is, the conductive grids 400 for forming the via hole structures HS in the first touch sub-electrode 101 and the first connection electrode 102 to realize electrical connection therebetween are all closed grids 420. Thus, it is conducive to improving the signal connection effect between the first connection electrode 102 and the corresponding first touch sub-electrode 101, thereby improving the stability and reliability of signal transmission in the first touch electrode 100.

It should be noted that in some other embodiments of the present disclosure, in the case that the first connection electrode 102 includes a plurality of first connection sub-electrodes 1021, the conductive grids 400 for forming the via hole structure HS in part of the first connection sub-electrode 1021 may also be set to non-closed conductive grids 430, and the embodiments of the present disclosure are not particularly limited in this aspect.

Figure 10:
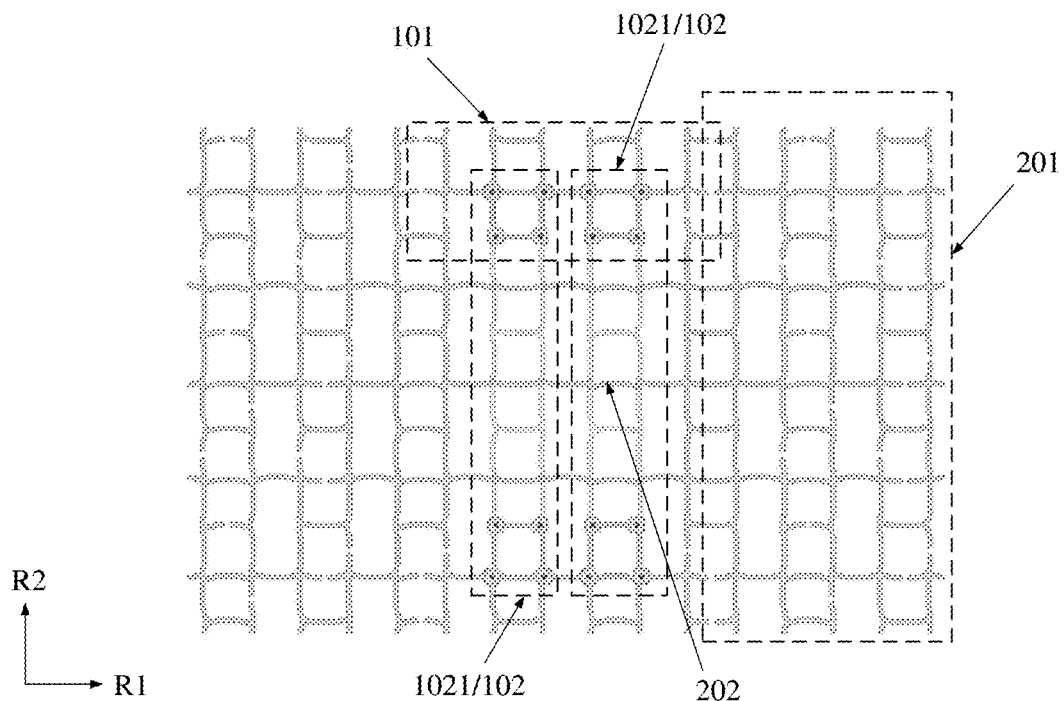
FIG. 10 is a schematic partial enlarged view of another example of the region RG1 illustrated in FIG. 2.

FIG. 10 is a schematic partial enlarged view of another example of the region RG1 illustrated in FIG. 2. It should be noted that except for the distance between the connection sub-electrodes 1021 in the first direction R1, the touch substrate 10 in the embodiments shown in FIG. 10 is substantially the same as or similar to that in the embodiments shown in FIG. 2 to FIG. 6B in structure, setting manner, function, etc., and the specific contents may refer to the corresponding descriptions regarding the embodiments shown in FIG. 2 to FIG. 6B, which will not be described here redundantly.

For example, as illustrated in FIG. 10, according to different actual requirements, compared with the embodiments shown in FIG. 4A and FIG. 4B, the distance between two adjacent connection sub-electrodes 1021 of the first connection electrode 102 in the first direction R1 may be relatively reduced, and the size of the second connection electrode 202 in the first direction R1 may also be reduced accordingly. Thus, the overlapping area of the first touch electrode 100 and the second touch electrode 200 in the overlapping region OVR may be further reduced, thereby shortening the charging time needed.

Figure 11:
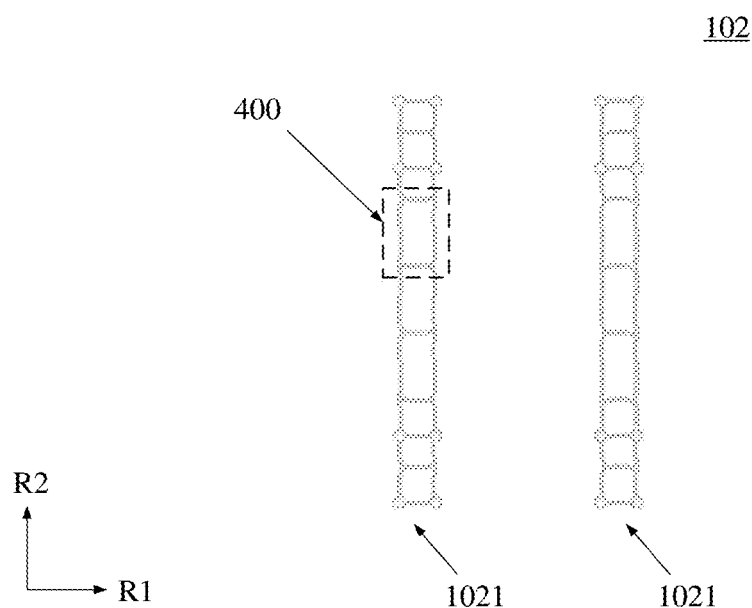
FIG. 11 is a schematic diagram of another first connection electrode provided by some embodiments of the present disclosure.
Figure 12A:
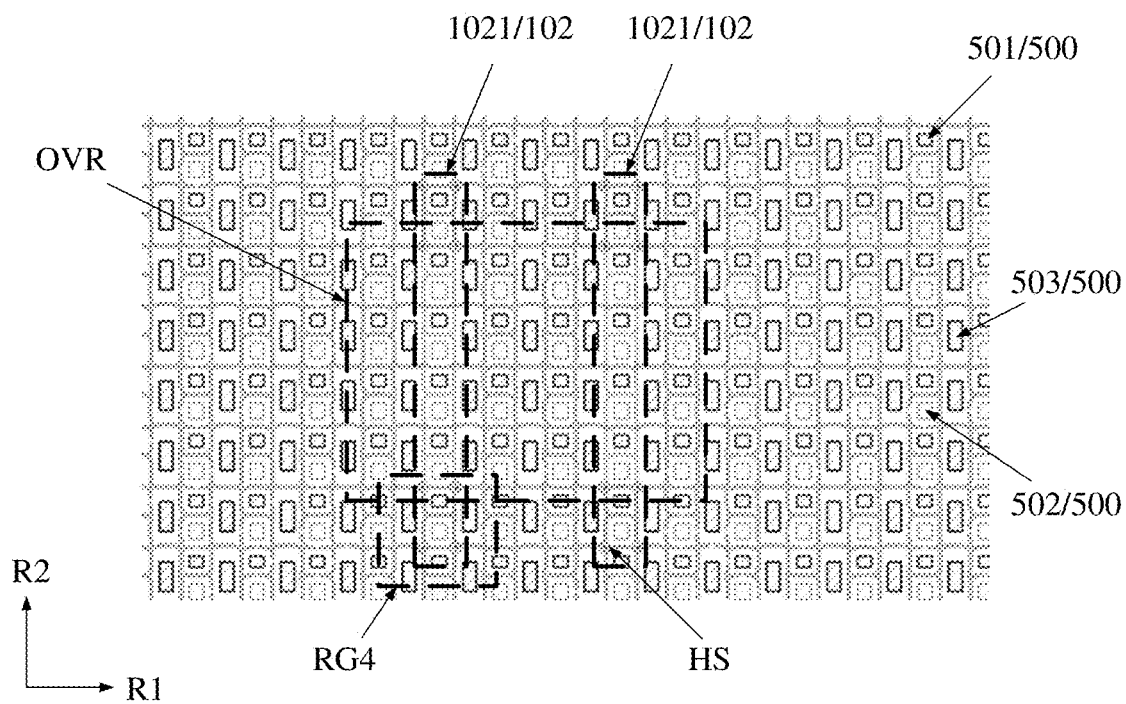
FIG. 12A is a schematic planar diagram of another touch substrate for being stacked with a display device provided by some embodiments of the present disclosure.
Figure 12B:
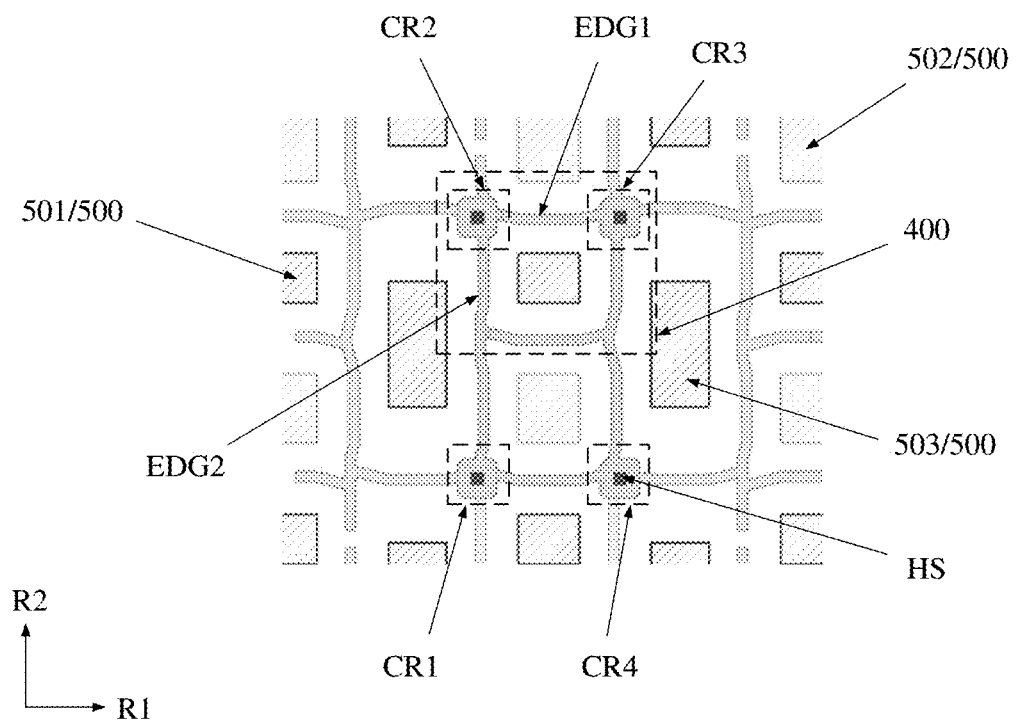
FIG. 12B is a schematic partial enlarged view of an example of a region RG4 illustrated in FIG. 12A.

FIG. 11 is a schematic diagram of another first connection electrode provided by some embodiments of the present disclosure, FIG. 12A is a schematic planar diagram of another touch substrate for being stacked with a display device provided by some embodiments of the present disclosure, and FIG. 12B is a schematic partial enlarged view of an example of a region RG4 illustrated in FIG. 12A. For example, FIG. 11 is a schematic diagram of the first connection electrode 102 shown in FIG. 12A. It should be noted that except for the number of the conductive grids 400 included in the connection sub-electrode 1021 and the position of the via hole structure HS for connection with the first touch sub-electrode 101, the touch substrate 10 in the embodiments shown in FIG. 11 to FIG. 12B is substantially the same as or similar to that in the embodiments shown in FIG. 2 to FIG. 6B and the embodiments shown in FIG. 7 to FIG. 8B in structure, setting manner, function, etc., and the specific contents may refer to the corresponding descriptions regarding the embodiments shown in FIG. 2 to FIG. 6B and the embodiments shown in FIG. 7 to FIG. 8B, which will not be described here redundantly.

For example, as illustrated in FIG. 11, FIG. 12A and FIG. 12B, compared with the embodiments shown in FIG. 4A to FIG. 6B, the connection sub-electrode 1021 in the first connection electrode 102 includes more conductive grids 400 in the overlapping region OVR, and the extending length of the connection sub-electrode 1021 in the second direction R2 is also relatively increased accordingly. Thus, the signal transmission load of the first touch electrode 100 in the overlapping region OVR may be reduced, thereby improving the stability and reliability of signal transmission in the overlapping region OVR.

It needs to be noted that the embodiments of the present disclosure have no particular limitation on the specific number of the conductive grids 400 included in the connection sub-electrode 1021 of the first connection electrode 102. For example, the number of the conductive grids 400 included in the connection sub-electrode 1021 may be one, two, three, four, five or more.

For example, as illustrated in FIG. 11 to FIG. 12B, compared with the examples shown in FIG. 8A and FIG. 8B, the via hole structure HS is connected to the corresponding first connection sub-electrode 1021 by means of a plurality of conductive grids 400 in the corresponding first connection sub-electrode 1021. For example, four via holes in the via hole structure HS are located at four vertices not shared by two adjacent conductive grids 400 in the second direction R2 in the first connection sub-electrode 1021, respectively, e.g., at vertices CR2 and CR3 of the upper conductive grid 400 and the vertices CR1 and CR4 of the lower conductive grid 400.

Thus, in the examples shown in FIG. 12A and FIG. 12B, taking the sub-pixel 501 as an example, compared with the examples shown in FIG. 8A and FIG. 8B, since via holes only need to be formed at the vertices CR2 and CR3 of the conductive grid 400 corresponding to the sub-pixel 501, the distances between the sub-pixel 501 and the edges EDG1 and EDG2 and the vertices CR1~CR4 of the corresponding conductive grid 400 can be increased properly. Taking the sub-pixel 502 as an example, compared with the examples shown in FIG. 8A and FIG. 8B, since via holes only need to be formed at the vertices CR1 and CR4 of the conductive grid 400 corresponding to the sub-pixel 502, the distances between the sub-pixel 502 and the edges EDG1 and EDG2 and the vertices CR1~CR4 of the corresponding conductive grid 400 can be increased properly. Taking the sub-pixel 503 as an example, compared with the examples shown in FIG. 8A and FIG. 8B, since corresponding via holes only need to be formed at the vertices of the conductive grid 400 corresponding to the sub-pixel 503 and no via hole is formed in the middle position, e.g., of the edge EDG2, of the conductive grid 400, the distances between the sub-pixel 503 and the edges EDG1 and EDG2 and the vertices CR1~CR4 of the corresponding conductive grid 400 can be increased properly. Thus, not only the normal display of each sub-pixel 500 can be guaranteed, but also the risk of color shift possibly occurring between two adjacent sub-pixels 500 can be weakened or avoided.

Figure 13A:
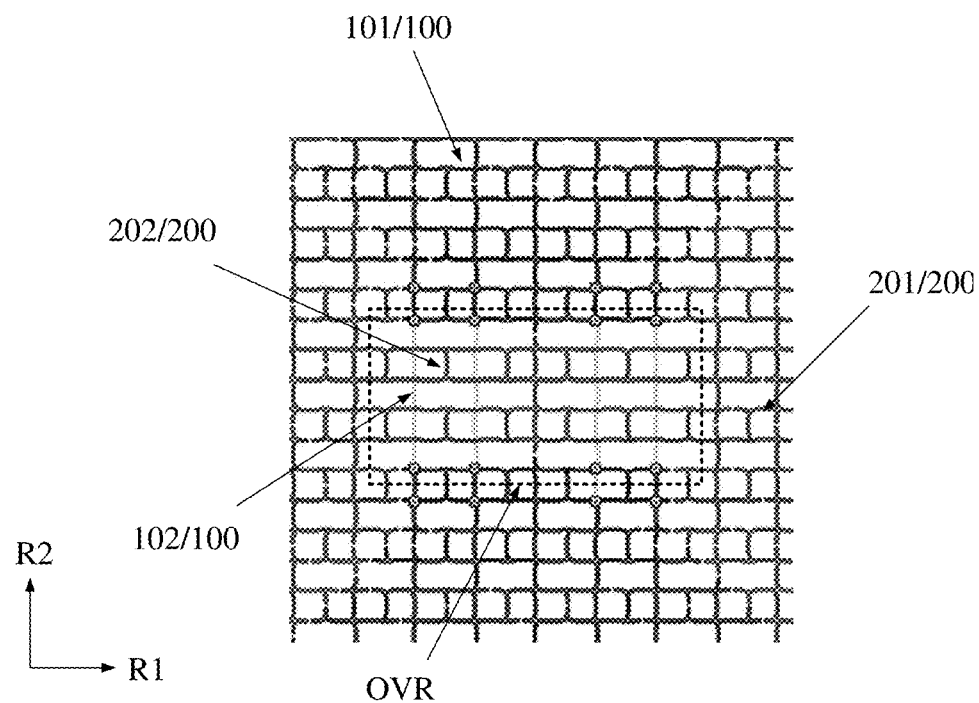
FIG. 13A is a schematic partial enlarged view of further still another example of the region RG1 illustrated in FIG. 2.
Figure 13B:
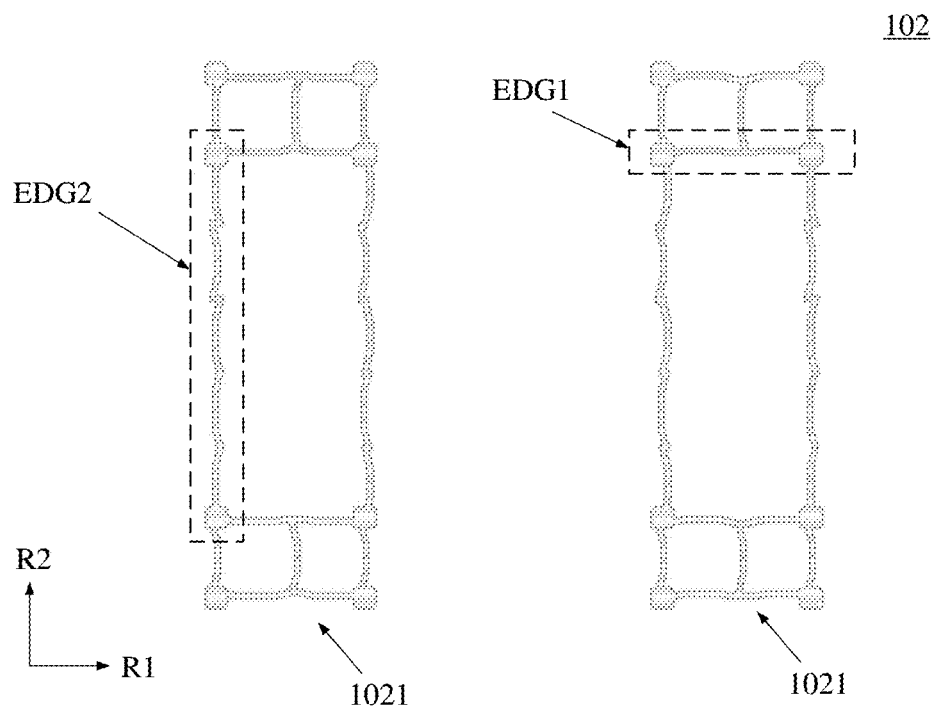
FIG. 13B is a schematic diagram of further still another first connection electrode provided by some embodiments of the present disclosure.

FIG. 13A is a schematic partial enlarged view of further still another example of the region RG1 illustrated in FIG. 2, and FIG. 13B is a schematic diagram of further still another first connection electrode provided by some embodiments of the present disclosure. For example, FIG. 13B is a schematic diagram of the first connection electrode 102 shown in FIG. 13A.

For example, as illustrated in FIG. 13A and FIG. 13B, in the overlapping region OVR, the edge EDG2 extending in the second direction R2 in the conductive grid 400 of the first touch electrode 100 and the edge EDG2 extending in the second direction R2 in the conductive grid 400 of the second touch electrode 200 are spaced apart from each other and arranged alternately in the first direction R1. Moreover, the grid structure of the first touch electrode 100 has no edge EDG1 extending in the first direction R1 in the overlapping region OVR. Thus, the overlapping area of the first touch electrode 100 and the second touch electrode 200 in the overlapping region OVR may be further reduced, thereby shortening the charging time needed.

It should be noted that the specific contents regarding the structure, setting method, function, or the like of the touch substrate 10 in the embodiments shown in FIG. 13A and FIG. 13B may refer to the corresponding descriptions regarding the embodiments shown in FIG. 2 to FIG. 6B, which will not be described here redundantly.

In some embodiments of the present disclosure, the insulating layer 330 may be made of an inorganic insulating material. For example, the inorganic insulating material is a transparent material. For example, the inorganic insulating material is such as silicon oxide, silicon nitride and silicon oxynitride, or a metal oxynitride insulating material including aluminium oxide, titanium nitride, etc.

For example, the insulating layer 330 may be made of an organic insulating material to obtain good bending resistance. For example, the organic insulating material is a transparent material. For example, the organic insulating material is an optically clear adhesive (OCA). For example, the organic insulating material may include polyimide (PI), acrylate, epoxy resin, polymethyl methacrylate (PMMA), etc.

It should be noted that in some other embodiments, two adjacent second touch sub-electrodes 201 in the first direction R1 may also be connected by a bridging structure, while two first touch sub-electrodes 101 in the second direction R2 may be connected by the first connection electrode 102 located in the same layer and integrally formed with the first touch sub-electrode 101. That is, the electrical connection method used between two adjacent first touch sub-electrodes 101 in the second direction R2 may be interchangeable with that used between two adjacent second touch sub-electrodes 201 in the first direction R1.

In some embodiments of the present disclosure, the first touch electrode 100 and the second touch electrode 200 may be insulated from each other. The first touch electrode 100 may be a touch control driving electrode, and the second touch electrode 200 may be a touch control sensing electrode; alternatively, the first touch electrode 100 may be a touch control sensing electrode, and the second touch electrode 200 may be a touch control driving electrode. The embodiments of the present disclosure are not particularly limited in this aspect.

For example, when the touch substrate described above is applied to, e.g., a display panel or a display device, each first touch electrode 100 and each second touch electrode 200 may be respectively electrically connected to one signal line and connected to a touch controller or a touch control integrated circuit by means of the signal line. Taking for example that the first touch electrode 100 is the touch control driving electrode while the second touch electrode 200 is the touch control sensing electrode, the touch control integrated circuit may be, e.g., a touch control chip configured to provide a touch control driving signal to the first touch electrode 100, receive a touch control sensing signal from the second touch electrode 200, and process the received touch control sensing signal, e.g., provide the processed data/signal to a system controller to realize the touch control sensing function. For example, one end, connected to the touch control integrated circuit, of the signal line may be arranged on the same side of the touch control region of the display panel, so as to facilitate connection with the touch control integrated circuit. Alternatively, one signal line may be disposed at each of two ends of one first touch electrode 100. During operation, the touch control integrated circuit inputs touch control driving signals in two directions (e.g., bilateral driving) to the one first touch electrode 100 through two signal lines, so that the signal loading speed on the first touch electrode 100 can be increased, thereby increasing the detection speed.

At least one embodiment of the present disclosure further provides a display panel that includes a display device and the touch substrate described in any one of the embodiments of the present disclosure. In the display panel, the display device and the touch substrate are stacked with each other.

Figure 14:
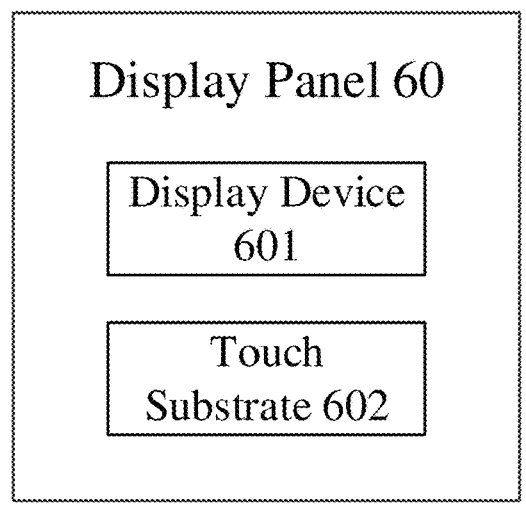
FIG. 14 is a schematic block diagram of a display panel provided by some embodiments of the present disclosure.

FIG. 14 is a schematic block diagram of a display panel provided by some embodiments of the present disclosure. For example, as illustrated in FIG. 14, the display panel 60 includes a display device 601 and a touch substrate 602. For example, the display device 601 and the touch substrate 602 may be stacked with each other. For example, the touch substrate 602 may be the touch substrate described in any one of the embodiments of the present disclosure, e.g., the touch substrate 10 in the above embodiments.

For example, in some embodiments of the present disclosure, the display panel 60 may further include an encapsulation layer located between the display device 601 and the touch substrate 602, thereby avoiding potential mutual interference between the display device 601 and such as a functional structure or a film material in the touch substrate 602.

Figure 15:
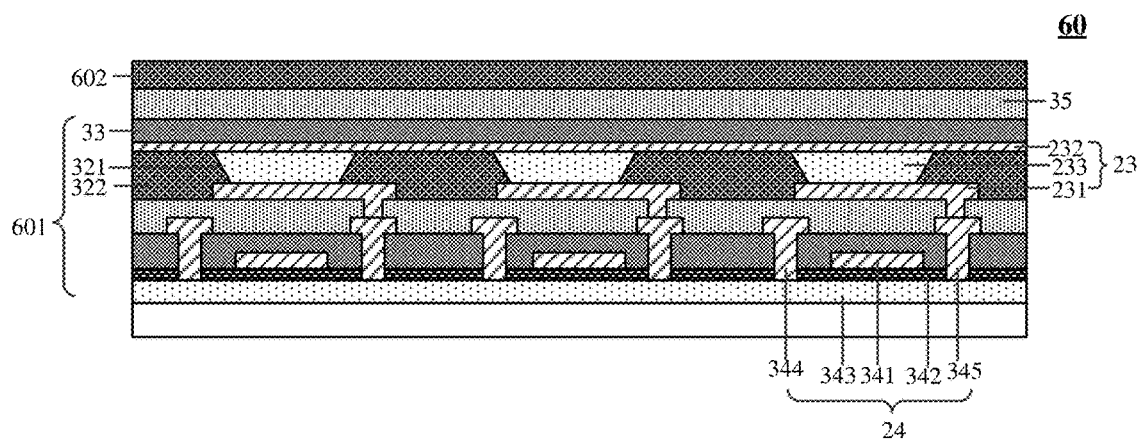
FIG. 15 is a schematic structural diagram of a specific example of a display panel provided by some embodiments of the present disclosure.

FIG. 15 is a schematic structural diagram of a specific example of a display panel 60 provided by some embodiments of the present disclosure.

As illustrated in FIG. 15, the touch substrate 602 is located on a display side of the display device 601, e.g., a side closer to the user during use.

For example, this embodiment is illustrated by taking for example that the display panel is an OLED display panel. For example, the OLED display panel may be an on-cell or in-cell touch control display panel. Certainly, in some other embodiments, the display panel may also be a liquid crystal display panel. The embodiments of the present disclosure have no limitation on the specific type of the display panel using the touch substrate provided by the embodiments of the present disclosure.

For example, the display device 601 includes a plurality of sub-pixels arranged in an array. For example, the display panel 60 is an OLED display panel, and the plurality of sub-pixels may include a green sub-pixel, a red sub-pixel, a blue sub-pixel or the like. Each sub-pixel includes a light-emitting element 23 and a pixel driving circuit for driving the light-emitting element 23 to emit light. The embodiments of the present disclosure have no limitations on the type and specific components of the pixel driving circuit. For example, the pixel driving circuit may be of a current-driven type or a voltage-driven type, and may be a 2T1C (i.e., two transistors and one capacitor, the two transistors including a driving transistor and a data writing transistor) driving circuit, or a driving circuit further including, on the basis of 2T1C, a compensating circuit (a compensating transistor), a light-emitting control circuit (a light-emitting control transistor), a reset circuit (a reset transistor), etc.

For the sake of clarity, FIG. 15 illustrates a first transistor 24, which is electrically connected to the light-emitting element 23 in the pixel driving circuit. The first transistor 24 may be a driving transistor configured to operate in a saturated state and control the magnitude of the current that drives the light-emitting element 23 to emit light. For example, the first transistor 24 may also be a light-emitting control transistor for controlling whether a current for driving the light-emitting element 23 to emit light flows therethrough. The embodiments of the present disclosure have no limitation on the specific type of the first transistor.

For example, the light-emitting element 23 is an organic light-emitting diode including a first electrode 231, a light-emitting layer 233, and a second electrode 232. One of the first electrode 231 and the second electrode 232 is an anode, while the other one is a cathode. For example, the first electrode 231 is the anode, and the second electrode 232 is the cathode. For example, the light-emitting layer 233 is an organic light-emitting layer or a quantum dot light-emitting layer. For example, in addition to the light-emitting layer 233, the light-emitting element 23 may also include auxiliary functional layers, such as a hole injection layer, a hole transport layer, an electron injection layer, and an electron transport layer. For example, the light-emitting element 23 may be a top-emitting structure. The first electrode 231 is reflective while the second electrode 232 is transmissive or semi-transmissive. For example, the first electrode 231 is made of a high work function material, e.g., an ITO/Ag/ITO stacked structure, to serve as the anode. The second electrode 232 is made of a low work function material, e.g., a semi-transmissive metal or metal alloy material (e.g., an Ag/Mg alloy material), to serve as the cathode.

The first transistor 24 includes a gate electrode 341, a gate insulating layer 342, an active layer 343, a first electrode 344, and a second electrode 345. The second electrode 345 is electrically connected to the first electrode 231 of the light-emitting element 23. The embodiments of the present disclosure have no limitations on the type, material, structure and the like of the first transistor 24. For example, the first transistor may be of a top gate type, a bottom gate type, etc. For example, the active layer 343 of the first transistor 24 may be made of amorphous silicon, polycrystalline silicon (low-temperature polycrystalline silicon and high-temperature polycrystalline silicon), oxide semiconductor (e.g., indium gallium tin oxide), etc. For example, the first transistor 24 may be an N type transistor or a P type transistor.

All the transistors (e.g., the first transistor 24) used in the embodiments of the present disclosure may be thin film transistors or field effect transistors or other switching devices having the same characteristics. The thin film transistor is described as an example in the embodiments of the present disclosure. The source electrode and the drain electrode of the transistor used herein may be structurally symmetrical and thus may be structurally indistinguishable. In the embodiments of the present disclosure, to distinguish between two electrodes other than the gate electrode of the transistor, one of the two electrodes is directly described as the first electrode, and the other is the second electrode.

As illustrated in FIG. 15, the display device 601 further includes a pixel definition layer 322. The pixel definition layer 322 is disposed on the first electrode 231 of the light-emitting element 23 and is provided with a plurality of openings 321 to expose first electrodes 231 of a plurality of sub-pixels, respectively, thereby defining a pixel opening region of each sub-pixel. The light-emitting layer of the sub-pixel is formed in the pixel opening region, and the second electrode 232 is formed as a common electrode (i.e., shared by multiple sub-pixels).

As illustrated in FIG. 15, the display device 601 further includes an encapsulation layer 33 located between the light-emitting element 23 and the touch substrate 602. The encapsulation layer 33 is configured to seal the light-emitting element 23 to prevent damage of devices (such as the light-emitting element 23) caused by the infiltration of external moisture and oxygen into the light-emitting element 23 and the driving circuit. For example, the encapsulation layer 33 may be a single-layer structure or a multi-layer structure, e.g., a multi-layer structure including an organic thin film or an inorganic thin film or including an organic thin film and an inorganic thin film which are alternately stacked.

For example, as illustrated in FIG. 15, the display panel 60 further includes a buffer layer 35 located between the display device 601 and the touch substrate 602. For example, the buffer layer 35 is formed on the encapsulation layer 33 to improve the adhesion force between the touch substrate 602 and the display device 601. For example, the buffer layer 35 may be an inorganic insulating layer. For example, the buffer layer 35 may be made of the silicon nitride, silicon oxide, silicon oxynitride, or the like. For example, the buffer layer 35 may also include a structure of a silicon oxide layer and a silicon nitride layer which are alternatively stacked.

The display panel 60 provided by the embodiments of the present disclosure has both the touch control function and the display function, and has all the technical effects of the touch substrate provided by the above embodiments of the present disclosure, which will not be described here redundantly.

At least one embodiment of the present disclosure further provides an electronic device that includes the display panel described in any one of the embodiments of the present disclosure, e.g., may include the display panel 60 described above.

Figure 16:
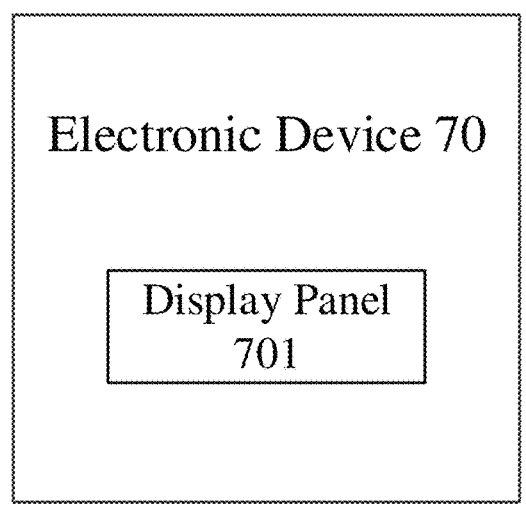
FIG. 16 is a schematic block diagram of an electronic device provided by some embodiments of the present disclosure.

FIG. 16 is a schematic block diagram of an electronic device provided by some embodiments of the present disclosure. For example, as illustrated in FIG. 16, the electronic device 70 includes a display panel 701. For example, the display panel 701 may be the display panel described in any one of the embodiments of the present disclosure, e.g., the display panel 60 in the above embodiments.

For example, the electronic device 70 may be a display apparatus or display device having the display function and the touch control function, e.g., an OLED display device, a QLED display device, or a liquid crystal display device.

For example, the electronic device 70 may be any product or component having the display function and the touch control function, such as a display, an OLED panel, an OLED television, a liquid crystal display panel, a liquid crystal display television, a QLED panel, a QLED television, an electronic paper, a mobile phone, a tablet computer, a notebook computer, a digital photo frame, a navigator, etc.

For the present disclosure, the following statements should be noted.

(1) The accompanying drawings related to the embodiment(s) of the present disclosure involve only the structure(s) in connection with the embodiment(s) of the present disclosure, and other structure(s) can be referred to common design(s).

(2) For the purpose of clarity, in accompanying drawings for illustrating the embodiment(s) of the present disclosure, the thickness of a layer or a region may be enlarged or narrowed, that is, the drawings are not drawn in a real scale. It should be understood that, in the case that a component such as a layer, a film, a region, a substrate, or the like is referred to be "on" or "under" another component, the component may be "directly" "on" or "under" the another component, or an intermediate component may be disposed therebetween.

(3) In case of no conflict, the embodiments of the present disclosure and features in one embodiment or in different embodiments can be combined to obtain new embodiments.

What have been described above merely are specific implementations of the present disclosure, and the protection scope of the present disclosure is not limited thereto. The protection scope of the present disclosure should be based on the protection scope of the claims.

What is claimed is:

1. A touch substrate, comprising:
   a base substrate; and
   a plurality of first touch electrodes and a plurality of second touch electrodes on the base substrate,
   wherein the plurality of first touch electrodes are arranged in a first direction, with each of the first touch electrodes extending in a second direction different from the first direction, and the plurality of second touch electrodes are arranged in the second direction, with each of the second touch electrodes extending in the first direction;
   each first touch electrode of the first touch electrodes and each second touch electrode of the second touch electrodes are spaced apart and insulated from each other;
   in a direction perpendicular to the base substrate, each first touch electrode overlaps with the plurality of second touch electrodes, respectively, and each second touch electrode overlaps with the plurality of first touch electrodes, respectively, so as to allow a plurality of overlapping regions and a plurality of non-overlapping regions to be formed between the plurality of first touch electrodes and the plurality of second touch electrodes;
   the first touch electrode and the second touch electrode respectively comprise a grid structure formed by a plurality of conductive grids;
   each conductive grid comprises a first edge extending in the first direction; and
   in the overlapping region, the conductive grid of the second touch electrode comprises at least one first edge, and any first edge in the conductive grid of the first touch electrode does not overlap with the at least one first edge in the conductive grid of the second touch electrode in the direction perpendicular to the base substrate;
   wherein each conductive grid further comprises a second edge extending in the second direction, and the first edge and the second edge are alternately connected to form the conductive grid; and
   wherein the first touch electrode comprises a plurality of first touch sub-electrodes and at least one first connection electrode, the plurality of first touch sub-electrodes are arranged in the second direction, and the first connection electrode is between two adjacent first touch sub-electrodes in the second direction to allow the two adjacent first touch sub-electrodes to be electrically connected;
   the second touch electrode comprises a plurality of second touch sub-electrodes and at least one second connection electrode, the plurality of second touch sub-electrodes are arranged in the first direction, and the second connection electrode is between two adjacent second touch sub-electrodes in the first direction to allow the two adjacent second touch sub-electrodes to be electrically connected;
   the first connection electrode and the second connection electrode are respectively in different conductive layers with respect to the base substrate; and
   the first connection electrode and the second connection electrode are at least partially in the overlapping region and partially overlap with each other in the direction perpendicular to the base substrate.

2. The touch substrate according to claim 1, wherein in the overlapping region, the conductive grid of the first touch electrode comprises at least one first edge, and the at least one first edge in the conductive grid of the first touch electrode is spaced apart from the at least one first edge in the conductive grid of the second touch electrode in the second direction.

3. The touch substrate according to claim 2, wherein in the overlapping region, each first edge in the conductive grid of the first touch electrode is between two adjacent first edges, in the second direction, in the conductive grid of the second touch electrode in the second direction.

4. The touch substrate according to claim 1, wherein in the overlapping region, the conductive grid of the first touch electrode comprises at least one second edge, and any second edge in the conductive grid of the second touch electrode does not overlap with the at least one second edge in the conductive grid of the first touch electrode in the direction perpendicular to the base substrate.

5. The touch substrate according to claim 4, wherein the conductive grid of the second touch electrode comprises at least one second edge, and the at least one second edge in the conductive grid of the second touch electrode is spaced apart from the at least one second edge in the conductive grid of the first touch electrode in the first direction.

6. The touch substrate according to claim 1, wherein the first direction is perpendicular to the second direction, and the conductive grid is a square conductive grid.

7. The touch substrate according to claim 1, wherein the first connection electrode comprises at least one first connection sub-electrode extending in the second direction, and the second connection electrode comprises at least one second connection sub-electrode extending in the first direction; and
   in the overlapping region, adjacent conductive grids in the second direction in the first touch electrode are connected in sequence in the second direction to form the first connection sub-electrode, and adjacent conductive grids in the first direction in the second touch electrode are connected in sequence in the first direction to form the second connection sub-electrode.

8. The touch substrate according to claim 7, wherein in response to the first connection electrode comprising a plurality of first connection sub-electrodes, the plurality of first connection sub-electrodes are sequentially arranged in the first direction, and extending directions of the plurality of first connection sub-electrodes are substantially parallel to each other; and in response to the second connection electrode comprising a plurality of second connection sub-electrodes, the plurality of second connection sub-electrodes are sequentially arranged in the second direction, and extending directions of the plurality of second connection sub-electrodes are substantially parallel to each other.

9. The touch substrate according to claim 7, wherein in the overlapping region, centers of adjacent conductive grids in the second direction in the first connection sub-electrode are approximately in an identical straight line extending in the second direction.

10. The touch substrate according to claim 7, wherein the touch substrate comprises a first conductive layer, an insulating layer, and a second conductive layer which are provided on the base substrate, the insulating layer is between the first conductive layer and the second conductive layer, and the first conductive layer and the second conductive layer are spaced apart and insulated from each other by the insulating layer in the direction perpendicular to the base substrate;

the first touch sub-electrode is in the second conductive layer, the first connection electrode is in the first conductive layer, the first touch sub-electrode is connected to the first connection electrode through a via hole structure penetrating through at least the insulating layer; and the second touch sub-electrode and the second connection electrode are in the second conductive layer.

11. The touch substrate according to claim 1, wherein an area of a region surrounded by the conductive grid of the first touch electrode in the overlapping region is greater than or equal to an area of a region surrounded by the conductive grid of the first touch electrode in the non-overlapping region, and/or an area of a region surrounded by the conductive grid of the second touch electrode in the overlapping region is greater than or equal to an area of a region surrounded by the conductive grid of the second touch electrode in the non-overlapping region.

12. The touch substrate according to claim 1, wherein an arrangement density of conductive grids in the first touch electrode in the overlapping region is smaller than or equal to an arrangement density of conductive grids in the first touch electrode in the non-overlapping region, and/or an arrangement density of conductive grids in the second touch electrode in the overlapping region is smaller than or equal to an arrangement density of conductive grids in the second touch electrode in the non-overlapping region.

13. The touch substrate according to claim 1, wherein the conductive grid comprises a closed grid and further comprises a non-closed grid with at least one notch being provided on at least one edge of the conductive grid; and in the first touch electrode, a number of notches in the conductive grid in the non-overlapping region is greater than or equal to a number of notches in the conductive grid in the overlapping region, and/or in the second touch electrode, a number of notches in the conductive grid in the non-overlapping region is greater than or equal to a number of notches in the conductive grid in the overlapping region.

14. The touch substrate according to claim 1, wherein the touch substrate is configured to be stacked with a display device, the display device comprises a plurality of pixel units arranged in an array, and each pixel unit of the plurality of pixel units comprises a plurality of sub-pixels; and one conductive grid corresponds to at least one sub-pixel, and an orthographic projection of the at least one sub-pixel on the base substrate is within a region surrounded by an orthographic projection of the corresponding one conductive grid on the base substrate.

15. The touch substrate according to claim 14, wherein at least one edge of the conductive grid extends in a folding-line shape.

16. The touch substrate according to claim 15, wherein the plurality of sub-pixels comprise a first sub-pixel and a second sub-pixel arranged in the second direction, the first sub-pixel and the second sub-pixel respectively correspond to one conductive grid, and a bending direction of the second edge of the conductive grid corresponding to the first sub-pixel and a bending direction of the second edge of the conductive grid corresponding to the second sub-pixel are opposite to each other in the first direction.

17. The touch substrate according to claim 15, wherein the plurality of sub-pixels comprise a first sub-pixel and a third sub-pixel arranged in the first direction, the first sub-pixel and the third sub-pixel respectively correspond to one conductive grid, and a bending direction of the first edge of the conductive grid corresponding to the first sub-pixel and a bending direction of the first edge of the conductive grid corresponding to the third sub-pixel are opposite to each other in the second direction.

18. A display panel, comprising a touch substrate and a display device, wherein the display device is stacked with the touch substrate;

the touch substrate comprises a base substrate and a plurality of first touch electrodes and a plurality of second touch electrodes on the base substrate;

the plurality of first touch electrodes are arranged in a first direction, with each of the first touch electrodes extending in a second direction different from the first direction, and the plurality of second touch electrodes are arranged in the second direction, with each of the second touch electrodes extending in the first direction;

each first touch electrode of the first touch electrodes and each second touch electrode of the second touch electrodes are spaced apart and insulated from each other;

in a direction perpendicular to the base substrate, each first touch electrode overlaps with the plurality of second touch electrodes, respectively, and each second touch electrode overlaps with the plurality of first touch electrodes, respectively, so as to allow a plurality of overlapping regions and a plurality of non-overlapping regions to be formed between the plurality of first touch electrodes and the plurality of second touch electrodes;

the first touch electrode and the second touch electrode respectively comprise a grid structure formed by a plurality of conductive grids;

each conductive grid comprises a first edge extending in the first direction; and in the overlapping region, the conductive grid of the second touch electrode comprises at least one first edge, and any first edge in the conductive grid of the first touch electrode does not overlap with the at least one first edge in the conductive grid of the second touch electrode in the direction perpendicular to the base substrate;

wherein each conductive grid further comprises a second edge extending in the second direction, and the first edge and the second edge are alternately connected to form the conductive grid; and wherein the first touch electrode comprises a plurality of first touch sub-electrodes and at least one first connection electrode, the plurality of first touch sub-electrodes are arranged in the second direction, and the first connection electrode is between two adjacent first touch sub-electrodes in the second direction to allow the two adjacent first touch sub-electrodes to be electrically connected;

the second touch electrode comprises a plurality of second touch sub-electrodes and at least one second connection electrode, the plurality of second touch sub-electrodes are arranged in the first direction, and the second connection electrode is between two adjacent second touch sub-electrodes in the first direction to allow the two adjacent second touch sub-electrodes to be electrically connected;

the first connection electrode and the second connection electrode are respectively in different conductive layers with respect to the base substrate; and the first connection electrode and the second connection electrode are at least partially in the overlapping region and partially overlap with each other in the direction perpendicular to the base substrate.

\* \* \* \* \*